US012655279B2

(12) United States Patent
Kim et al.

(10) Patent No.: US 12,655,279 B2
(45) **Date of Patent: *Jun. 16, 2026**

(54) ETHYLENE/ALPHA-OLEFIN COPOLYMER AND METHOD FOR PREPARING THE SAME

(71) Applicant: LG Chem, Ltd., Seoul (KR)

(72) Inventors: Seul Ki Kim, Daejeon (KR); Hae Woong Park, Daejeon (KR); Young Woo Lee, Daejeon (KR); Ki Eun Kim, Daejeon (KR); Choong Hoon Lee, Daejeon (KR)

(73) Assignee: LG Chem, Ltd., Seoul (KR)

(*) Notice: Subject to any disclaimer, the term of this patent is extended or adjusted under 35 U.S.C. 154(b) by 1356 days.

This patent is subject to a terminal disclaimer.

(21) Appl. No.: 17/050,998

(22) PCT Filed: May 3, 2019

(86) PCT No.: PCT/KR2019/005368

§ 371 (c)(1),
(2) Date: Oct. 27, 2020

(87) PCT Pub. No.: WO2019/212307

PCT Pub. Date: Nov. 7, 2019

(65) Prior Publication Data

US 2021/0238398 A1 Aug. 5, 2021

(30) Foreign Application Priority Data

May 4, 2018 (KR) ........................ 10-2018-0052071
May 4, 2018 (KR) ........................ 10-2018-0052072
(Continued)

(51) Int. Cl.
*C08L 23/0807* (2025.01)
*C08F 4/6592* (2006.01)
(Continued)

(52) U.S. Cl.
CPC ........ *C08L 23/0815* (2013.01); *C08F 4/6592* (2013.01); *C08F 210/08* (2013.01);
(Continued)

(58) Field of Classification Search
CPC ............. C08L 23/0815; C08L 2201/10; C08L 2203/16; C08L 2314/06; C08F 4/6592;
(Continued)

(56) References Cited

U.S. PATENT DOCUMENTS 4,935,474 A 6/1990 Ewen et al.
5,602,223 A 2/1997 Sasaki et al.
(Continued)

FOREIGN PATENT DOCUMENTS

CN 1087648 A 6/1994
CN 1392880 A 1/2003
(Continued)

OTHER PUBLICATIONS

Bortolussi, F. et al., "Synthesis of Silica-Supported Metallocene Catalysts for Olefin Polymerization", Macromolecular Chemistry and Physics, Dec. 2002, pp. 2501-2507, vol. 203, Wiley-VCH Verlag, Weinheim, DE.
(Continued)

*Primary Examiner* — Andrew J. Oyer
(74) *Attorney, Agent, or Firm* — Lerner David LLP

(57) ABSTRACT

The present invention provides an ethylene/alpha-olefin copolymer satisfying the following conditions (a) to (d):
(a) density: 0.850 to 0.910 g/cc,
(b) melt index (MI, 190° C., 2.16 kg load conditions): 0.1 to 100 dg/min,
(c) molecular weight distribution (MWD): 1.5 to 3.0, and
(d) a $R_v$ value of 0.18 to 0.59.

19 Claims, 3 Drawing Sheets

(30) Foreign Application Priority Data

Sep. 18, 2018 (KR) ........................ 10-2018-0111510
Sep. 18, 2018 (KR) ........................ 10-2018-0111511
Apr. 30, 2019 (KR) ........................ 10-2019-0050468

(51) Int. Cl.
*C08F 210/08* (2006.01)
*G02B 1/04* (2006.01)

(52) U.S. Cl.
CPC ............ *G02B 1/04* (2013.01); *C08L 2201/10* (2013.01); *C08L 2203/16* (2013.01); *C08L 2314/06* (2013.01)

(58) Field of Classification Search
CPC ................ C08F 210/08; C08F 4/65908; C08F 4/65912; C08F 2420/02; C08F 2420/06; C08F 210/16; C08F 2/38; G02B 1/04; C08J 2323/08; C08J 5/18
See application file for complete search history.

(56) References Cited

U.S. PATENT DOCUMENTS

| | | | |
|---|---|---|---|
| 5,914,289 | A | 6/1999 | Razavi |
| 6,828,394 | B2 | 12/2004 | Vaughan et al. |
| 6,841,631 | B2 | 1/2005 | Loveday et al. |
| 6,894,128 | B2 | 5/2005 | Loveday et al. |
| 8,173,828 | B2 | 5/2012 | Voskoboynikov et al. |
| 10,487,158 | B2 * | 11/2019 | Woo ...................... C08F 210/16 |
| 2003/0008997 | A1 | 1/2003 | Murakami et al. |
| 2008/0306217 | A1 | 12/2008 | Karjala et al. |
| 2010/0087609 | A1 | 4/2010 | Park et al. |
| 2010/0160497 | A1 | 6/2010 | Karjala et al. |
| 2016/0326281 | A1 | 11/2016 | Kim et al. |
| 2016/0331073 | A1 | 11/2016 | Nakano et al. |

FOREIGN PATENT DOCUMENTS

| | | | |
|---|---|---|---|
| CN | 101336254 | A | 12/2008 |
| CN | 101679561 | A | 3/2010 |
| CN | 106661142 | A | 5/2017 |
| JP | 2014168091 | A | 9/2014 |
| JP | 2015-127402 | A | 7/2015 |
| JP | 2015162498 | A | 9/2015 |
| JP | 2015199930 | A | 11/2015 |
| JP | 2016056337 | A | 4/2016 |
| KR | 100293574 | B1 | 11/2001 |
| KR | 20040076965 | A | 9/2004 |
| KR | 20090031355 | A | 3/2009 |
| KR | 20160054849 | A | 5/2016 |
| KR | 20170073385 | A | 6/2017 |
| WO | 2004076502 | A1 | 9/2004 |

OTHER PUBLICATIONS

Bruaseth, I. et al., "Dual Site Ethene/1-Hexene Copolymerization with MAO Activated (1,2,4-Me3Cp)2ZrCI2 and (Me5Cp)2ZrCI2 Catalysts. Possible Transfer of Polymer Chains between the Sites", Macromolecules, Apr. 2003, pp. 3026-3034, vol. 36, American Chemical Society.

Extended European Search Report including Written Opinion for Application No. 19796558.5 dated May 10, 2021, pp. 1-9.

He, Y. et al., "Terminal and Internal Unsaturations in Poly(ethylene-co-1-octene)", Macromolecules, Jun. 2014, pp. 3782-3790, vol. 47, American Chemical Society.

Parida D, Serra CA, Garg DK, Hoarau Y, Bally F, Muller R, Bouquey M. Coil flow inversion as a route to control polymerization in microreactors. Macromolecules. May 27, 2014;47(10):3282-7.

International Search Report for PCT/KR2019/005368 mailed Aug. 14, 2019; 3 pages.

Min. S. et al., "Study on CpTi (dbm)Ci2/MgCi2—SiO2/MAO Catalyzed Ethylene Polymerization and Copolymerization with Other a-Olefins" Petrochemical Technology, Oct. 2003, pp. 873-876, vol. 32. [English translation of abstract only].

Search Report dated Jul. 26, 2022 from the Office Action for Chinese Application No. 201980028472.9 issued Aug. 3, 2022, pp. 1-3.

European Office Action for Application No. 19796558.5-1102 dated Jun. 15, 2023, pp. 1-5.

* cited by examiner

ETHYLENE/ALPHA-OLEFIN COPOLYMER AND METHOD FOR PREPARING THE SAME

CROSS-REFERENCE TO RELATED APPLICATIONS

This application is a national phase entry under 35 U.S.C. § 371 of International Application No. PCT/KR2019/005368 filed May 3, 2019, which claims priority from Korean Patent Application No. 10-2018-0052071, filed on May 4, 2018, Korean Patent Application No. 10-2018-0111511, filed on Sep. 18, 2018, Korean Patent Application No. 10-2018-0111510, filed on Sep. 18, 2018, Korean Patent Application No. 10-2018-0052072, filed on May 4, 2018, and Korean Patent Application No. 10-2019-0050468, filed on Apr. 30, 2019, all of which are incorporated herein by reference.

TECHNICAL FIELD

The present invention relates to an ethylene/alpha-olefin copolymer having narrow molecular weight distribution and the vinyl group content in a polymer, controlled in a certain range, and showing excellent physical properties, and a method for preparing the same.

BACKGROUND ART

Olefin polymerization catalyst systems may be classified into Ziegler-Natta and metallocene catalyst systems, and these two highly active catalyst systems have been developed in accordance with the characteristics of each. The Ziegler-Natta catalyst has been widely applied in a commercial process since its invention in the 1950s, but is a multi-site catalyst in which many active sites coexist and has the characteristics of broad molecular weight distribution of a polymer. In addition, since the composition distribution of a comonomer is nonuniform, there are limitations in securing desired physical properties.

Meanwhile, the metallocene catalyst is composed of the combination of a main catalyst having a transition metal compound as a main component and a promoter which is an organometal compound having aluminum as a main component, and such catalyst is a homogeneous complex catalyst and is a single site catalyst. According to the single site properties, a polymer having narrow molecular weight distribution and uniform composition distribution of a comonomer is obtained, and according to the structural deformation of the ligand of a catalyst and polymerization conditions, the steric regularity, copolymerization properties, a molecular weight, crystallinity, etc. of a polymer may be changed.

U.S. Pat. No. 5,914,289 discloses a method of controlling the molecular weight and molecular weight distribution of a polymer using metallocene catalysts supported by individual supports, but the amount of a solvent used for preparing a supported catalyst and preparation time are consumed a lot, and there is inconvenience to support the metallocene catalysts used on individual supports.

Korean Patent Application No. 10-2003-0012308 discloses a method of controlling molecular weight distribution by supporting a dinuclear metallocene catalyst and a mononuclear metallocene catalyst together with an activator on a support and polymerizing while changing the combination of the catalysts in a reactor. However, such method has limitations in accomplishing the properties of individual catalysts at the same time, and a metallocene catalyst part is separated from a support component of a completed catalyst, thereby inducing fouling in a reactor.

Meanwhile, a linear low-density polyethylene is prepared by copolymerizing ethylene and alpha olefin using a polymerization catalyst at a low pressure, and is a resin having narrow molecular weight distribution and a short chain branch with a certain length without a long chain branch. A linear low-density polyethylene film has the properties of a common polyethylene, high breaking strength and elongation, and excellent tearing strength and falling weight impact strength, and thus, is increasingly used in a stretch film, an overlap film, etc., to which the conventional low-density polyethylene or high-density polyethylene is difficult to apply.

However, most linear low-density polyethylene using 1-butene or 1-hexene as a comonomer is prepared in a single gas phase reactor or a single loop slurry reactor, and has higher productivity when compared with a process using a 1-octene comonomer. However, the properties of such a product also are greatly inferior to a case using a 1-octene comonomer due to the limitations of catalyst technology used and process technology used, and the molecular weight distribution thereof is narrow, and thus, processability is poor.

U.S. Pat. No. 4,935,474 reports a method of preparing polyethylene having broad molecular weight distribution by using two or more metallocene compounds. U.S. Pat. No. 6,828,394 reports a method of preparing polyethylene having excellent processability and which is particularly suitable as a film, by mixing a comonomer having good bonding properties and a comonomer without them. In addition, U.S. Pat. Nos. 6,841,631 and 6,894,128 indicate that polyethylene having bimodal or multimodal molecular weight distribution is prepared as a metallocene catalyst using at least two kinds of metal compounds, and is applicable to the use of a film, a blow molding, a pipe, etc. However, such products have improved processability but a nonuniform dispersion state by the molecular weight in a unit particle, and extrusion appearance is rough and physical properties are unstable though under relatively good extrusion conditions.

In such a background, the preparation of an excellent product making balance between physical properties and processability is continuously required, and particularly, an excellent polyethylene copolymer having excellent processability and excellent optical properties is required.

PRIOR ART DOCUMENTS

Patent Documents

U.S. Pat. No. 5,914,289
Korean Patent Publication No. 2004-0076965
U.S. Pat. No. 4,935,474
U.S. Pat. No. 6,828,394
U.S. Pat. No. 6,841,631
U.S. Pat. No. 6,894,128

DISCLOSURE OF THE INVENTION

Technical Problem

Accordingly, the present invention is to solve the above-described limitations of the conventional art, and to provide an ethylene/alpha-olefin copolymer having narrow molecular weight distribution and the vinyl group content in a polymer, controlled in a certain range, and showing excellent physical properties, and a method for preparing the same.

In addition, the present invention provides a resin composition for an optical film showing excellent physical properties, particularly, excellent crosslinking properties by including the ethylene/alpha-olefin copolymer.

In addition, an object of the present invention is to provide a resin composition for an optical film having improved optical properties such as yellow index (YI) and total light transmittance (Tt), and an optical film manufactured using the resin composition.

Technical Solution

An embodiment of the present invention provides an ethylene/alpha-olefin copolymer satisfying the following conditions (a) to (d):

(a) density: 0.850 to 0.910 g/cc, (b) melt index (MI, 190° C., 2.16 kg load conditions): 0.1 to 100 dg/min, (c) molecular weight distribution (MWD): 1.5 to 3.0, and (d) a $R_v$ value according to Equation 1 below of 0.18 to 0.59:

$$R_v = \frac{N_v}{N_{vd} + N_{tv} + N_{vi} + N_v} \quad \text{[Equation 1]}$$

In Equation 1, $N_{vd}$, $N_{tv}$, $N_{vi}$ and $N_v$ mean the number of vinylidene, trivinyl, vinylene and vinyl functional groups per 1000 carbon atoms, respectively, measured by nuclear magnetic spectroscopy analysis.

Another embodiment of the present invention provides a method for preparing the ethylene/alpha-olefin copolymer, including a step of polymerizing ethylene and an alpha-olefin-based monomer by injecting hydrogen in 5 to 100 cc/min in the presence of a catalyst composition including a transition metal compound of the following Formula 1:

[Formula 1]

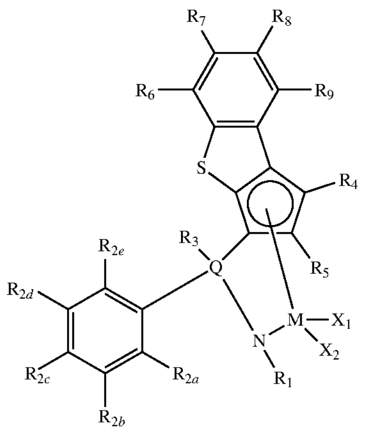

In Formula 1, $R_1$ is hydrogen; C1-20 alkyl; C3-20 cycloalkyl; C2-20 alkenyl; C1-20 alkoxy; C6-20 aryl; C7-20 arylalkoxy; C7-20 alkylaryl; or C7-20 arylalkyl, $R_{2a}$ to $R_{2e}$ are each independently hydrogen; halogen; C1-20 alkyl; C3-20 cycloalkyl; C2-20 alkenyl; C1-20 alkoxy; or C6-20 aryl, $R_3$ is hydrogen; halogen; C1-20 alkyl; C3-20 cycloalkyl; C2-20 alkenyl; C6-20 aryl; C7-20 alkylaryl; C7-20 arylalkyl; C1-20 alkyl amino; C6-20 aryl amino; or phenyl which is substituted with one or more selected from the group consisting of halogen, C1-20 alkyl, C3-20 cycloalkyl, C2-20 alkenyl, C1-20 alkoxy and C6-20 aryl, $R_4$ to $R_9$ are each independently hydrogen; silyl; C1-20 alkyl; C3-20 cycloalkyl; C2-20 alkenyl; C6-20 aryl; C7-20 alkylaryl; C7-20 arylalkyl; or a metalloid radical of a metal in group 14 which is substituted with C1-20 hydrocarbyl; among the R6 to R9, adjacent two or more may be connected with each other to form a ring, Q is Si, C, N, P or S, M is a transition metal in group 4, and $X_1$ and $X_2$ are each independently hydrogen; halogen; C1-20 alkyl; C3-20 cycloalkyl; C2-20 alkenyl; C6-20 aryl; C7-20 alkylaryl; C7-20 arylalkyl; C1-20 alkylamino; or C6-20 arylamino.

Another embodiment of the present invention provides a resin composition for an optical film, including the ethylene/alpha-olefin copolymer.

Another embodiment of the present invention provides an optical film, including the resin composition.

Advantageous Effects

The ethylene/alpha-olefin copolymer of the present invention has narrower molecular weight distribution than the conventional technique, and the vinyl content in a polymer satisfies a specific ratio with respect to total unsaturated functional groups, thereby showing excellent crosslinking properties.

In addition, if the ethylene/alpha-olefin copolymer of the present invention is applied as a resin composition for an optical film, optical properties such as yellow index (YI) and total light transmittance (Tt) are excellent. Accordingly, the ethylene/alpha-olefin copolymer of the present invention may be usefully applied for preparing a resin composition for an optical film which requires excellent optical properties.

MODE FOR CARRYING OUT THE INVENTION

Figure 1:
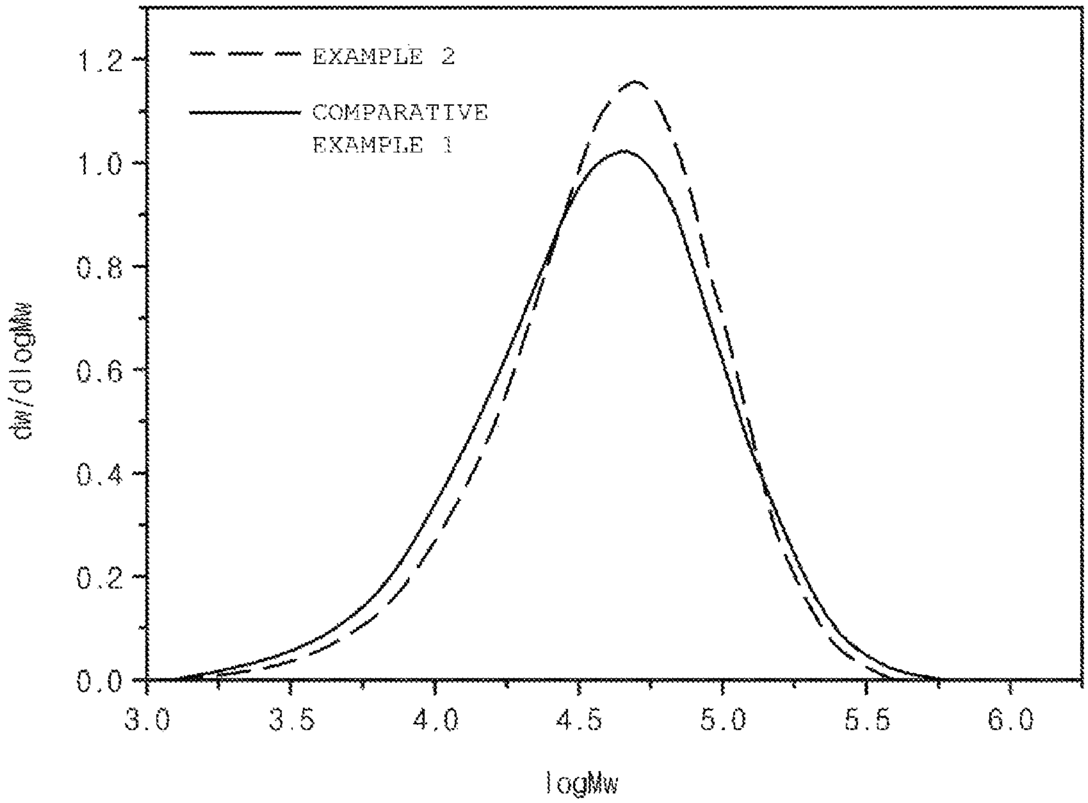
FIG. 1 shows molecular weight distribution on Example 2 as an embodiment of the present invention and Comparative Example 1.

The terminology used herein is for the purpose of describing particular example embodiments only and is not intended to limit the present invention. The singular forms are intended to include the plural forms as well, unless the context clearly indicates otherwise. It will be understood that the terms “comprise” and/or “comprising,” when used in this specification, specify the presence of stated features, steps, elements or the combination thereof, but do not preclude the presence or addition of one or more other features, steps, elements or the combination thereof.

The present invention may have various changes and be embodied in various forms, and specific embodiments are illustrated and will be explained in detail below. However, it should be understood that the present invention is not limited to a specific disclosure type, but includes all changes, equivalents and substituents included in the scope and technical range of the present invention.

The term "composition" used in the present disclosure includes a mixture of materials, including the corresponding composition as well as reaction product and decomposition product formed from materials of the corresponding composition.

The term "polymer" used in the present disclosure refers to a polymer compound prepared by polymerizing monomers which may be the same or different kinds. As described above, the common term, polymer refers to a polymer prepared by only one kind of monomer and includes a commonly used term, homopolymer, and a term, interpolymer which is regulated as follows.

The term "interpolymer" used in the present disclosure refers to a polymer prepared by polymerizing at least two kinds of different monomers. Thus, the common term, interpolymer refers to a polymer prepared from two different kinds of monomers and includes a commonly used copolymer, and a polymer prepared from two or more different kinds of monomers.

1. Ethylene/alpha-olefin copolymer

Hereinafter, the ethylene/alpha-olefin copolymer of the present invention will be explained in detail.

The ethylene/alpha-olefin copolymer according to an embodiment of the present invention satisfies the following conditions (a) to (d)

(a) density: 0.850 to 0.910 g/cc, (b) melt index (MI, 190° C., 2.16 kg load conditions): 0.1 to 100 dg/min, (c) molecular weight distribution (MWD): 1.5 to 3.0, and (d) a $R_v$ value according to Equation 1 below of 0.18 to 0.59:

$$R_v = \frac{N_v}{N_{vd} + N_{tv} + N_{vl} + N_v} \quad \text{[Equation 1]}$$

In Equation 1, $N_{vd}$, $N_{tv}$, $N_{vl}$ and $N_v$ mean the number of vinylidene, trivinyl, vinylene and vinyl functional groups per 1000 carbon atoms, respectively, measured by nuclear magnetic spectroscopy analysis.

The present invention may largely improve the physical properties, particularly, the crosslinking properties of an ethylene/alpha-olefin copolymer by using a catalyst which will be explained later and injecting the optimal amount of hydrogen during polymerizing so as to fulfill the conditions (a) to (d) at the same time.

Particularly, the ethylene/alpha-olefin copolymer of the present invention is a low-density polymer having a density measured according to ASTM D-792 in a range of 0.850 to 0.910 g/cc. Particularly, the density may be 0.850 g/cc or more, or 0.855 g/cc or more, or 0.86 g/cc or more, or 0.865 g/cc or more, and 0.91 g/cc or less, or 0.90 g/cc or less, or 0.89 g/cc or less.

Generally, the density of an olefin-based polymer is influenced by the kind and amount of a monomer used during polymerization, a polymerization degree, etc., and a copolymer may be largely influenced by the amount of a comonomer. With the increase of the comonomer, an ethylene/alpha-olefin copolymer having a low density may be prepared, and the amount of the comonomer which is capable of being introduced into a copolymer may be dependent on the copolymerization properties of a catalyst, that is, the properties of the catalyst.

In the present invention, a large amount of a comonomer may be introduced due to the use of a catalyst composition including a transition metal compound having a specific structure. As a result, the ethylene/alpha-olefin copolymer according to an embodiment of the present invention may have a low density as described above, and as a result, excellent processability may be shown. More particularly, the ethylene/alpha-olefin copolymer may have a density of 0.850 to 0.910 g/cc, and in this case, the maintenance of mechanical properties and improving effect of impact strength according to the control of the density are even more remarkable.

In addition, the ethylene/alpha-olefin copolymer of the present invention has narrow molecular weight distribution (MWD) in a range of 1.5 to 3.0. In an embodiment, the molecular weight distribution may be 1.6 or more, or 1.7 or more, or 1.8 or more, and 2.7 or less, or 2.4 or less, or 2.2 or less.

Generally, in case of polymerizing two or more kinds of monomers, molecular weight distribution (MWD) increases, and as a result, impact strength and mechanical properties may decrease and blocking phenomenon, etc. may arise. About this, in the present invention, the optimal amount of hydrogen is injected during carrying out polymerization reaction, and the molecular weight and molecular weight distribution of the ethylene/alpha-olefin copolymer thus prepared is decreased, and as a result, crosslinking properties, impact strength, mechanical properties, etc. are improved.

Meanwhile, in the present invention, the weight average molecular weight (Mw) and number average molecular weight (Mn) are polystyrene conversion molecular weights which are analyzed by gel permeation chromatography (GPC), and the molecular weight distribution may be calculated from the ratio of Mw/Mn.

The ethylene/alpha-olefin copolymer according to an embodiment of the present invention may be a polymer having a weight average molecular weight (Mw) of 40,000 to 150,000 g/mol. More particularly, the weight average molecular weight may be 45,000 g/mol or more, or 49,000 g/mol or more, or 52,000 g/mol or more, and 130,000 g/mol or less, or 90,000 g/mol or less, or 65,000 g/mol or less.

In addition, the ethylene/alpha-olefin copolymer of the present invention has a melt index (MI, 190° C., 2.16 kg load conditions) in a range of 0.1 to 100 dg/min. In an embodiment, the ethylene/alpha-olefin copolymer of the present invention may have the melt index (MI) of 1 dg/min or more, or 1.5 dg/min or more, or 3 dg/min or more, or 5 dg/min or more, or 12 dg/min or more, or 16 dg/min or more, and 90 dg/min or less, or 70 dg/min or less, or 40 dg/min or less, or 37 dg/min or less, or 35 dg/min or less.

In addition, the ethylene/alpha-olefin copolymer may have the melt index (MI, measured under 190° C. and 10 kg load conditions according to ASTM D1238) in a range of 5 to 230 dg/min.

In addition, the ethylene/alpha-olefin copolymer has a $MI_{10}/MI_{2.16}$ value, which is a value of melt index (190° C., 10 kg load conditions) with respect to a melt index (190° C., 2.16 kg load conditions), of 8.5 or less, or 7.9 or less, or 7.5 or less, and 5.0 or more, or 5.5 or more, or 6.0 or more. $MI_{10}/MI_{2.16}$ is an index on the long chain branch degree of a copolymer, and if the $MI_{10}/MI_{2.16}$ value is 8.5 or less, it means that a long chain branch is small.

If the weight average molecular weight and the melt index satisfy the above-described range, the copolymer may be suitably applied to a resin composition for an optical film.

That is, the mechanical properties and impact strength of the ethylene/alpha-olefin copolymer may be controlled by adjusting the kind of the catalyst used and the amount used of the catalyst during polymerization, and by satisfying the above-described conditions, excellent mechanical properties may be maintained and improved processability may be shown.

In addition, the ethylene/alpha-olefin copolymer of the present invention is characterized in that the vinyl group content per 1000 carbon atoms in the copolymer is controlled to a certain range. Particularly, the ethylene/alpha-olefin copolymer of the present invention has a $R_v$ value according to the following Equation 1 of 0.18 to 0.59:

$$R_v = \frac{N_v}{N_{vd} + N_{tv} + N_{vl} + N_v} \quad \text{[Equation 1]}$$

In Equation 1, $R_v$ is a ratio of the number of vinyl groups with respect to the number of functional groups per 1000 carbon atoms, measured through nuclear magnetic spectroscopy analysis.

Selectively, the ethylene/alpha-olefin copolymer of the present invention may have a $R_v$a value according to the following Equation 2 of 0.25 or less:

$$R_{vd} = \frac{N_{vd}}{N_{vd} + N_{tv} + N_{vl} + N_v} \quad \text{[Equation 2]}$$

In Equation 2, $R_v$a is a ratio of the number of vinylidene groups with respect to the number of functional groups per 1000 carbon atoms, measured through nuclear magnetic spectroscopy analysis.

In Equations 1 and 2, $N_{vd}$, $N_{tv}$, $N_{vl}$ and $N_v$ mean the number of vinylidene, trivinyl, vinylene and vinyl functional groups, respectively, per 1000 carbon atoms, measured through nuclear magnetic spectroscopy analysis.

In an embodiment, the $R_v$ value may be 0.55 or less, or 0.50 or less, or 0.46 or less, or 0.40 or less, or 0.39 or less, or 0.35 or less, or 0.32 or less, or 0.30 or less, or 0.29 or less, and 0.19 or more, or 0.22 or more, or 0.24 or more.

The vinyl group content in the copolymer may be controlled by controlling the polymerization temperature and the injection amount of hydrogen during preparation, and if the ethylene/alpha-olefin copolymer of the present invention satisfy the vinyl group content, and if the copolymer is applied to a resin composition for an optical film, excellent crosslinking degree and/or optical properties may be shown.

In an embodiment, the $R_v$a value may be 0.25 or less, or 0.22 or less, or 0.20 or less, or 0.15 or less, or 0.10 or less, or 0.09 or less, or 0.08 or less, or 0.07 or less, or 0.06 or less, and 0.02 or more, or 0.03 or more, or 0.04 or more. If the vinylidene group content satisfies the above-described numerical range, narrow molecular weight distribution, excellent crosslinking properties, and consequent optical properties may be shown.

Selectively, the ethylene/alpha-olefin copolymer of the present invention is characterized in that the trivinyl content per 1000 carbon atoms in the copolymer is controlled to a certain ratio or more. Particularly, the ethylene/alpha-olefin copolymer of the present invention may have a Rev value according to the following Equation 3 of 0.12 or more:

$$R_{tv} = \frac{N_{tv}}{N_{vd} + N_{tv} + N_{vl} + N_v} \quad \text{[Equation 3]}$$

In Equation 3, Re, is a ratio of the number of the trivinyl groups with respect to the number of functional groups per 1000 carbon atoms, measured through nuclear magnetic spectroscopy analysis.

The trivinyl content in the copolymer may be controlled through the control of the polymerization temperature and the injection amount of hydrogen during preparation. The double bond in the copolymer is bonded to a radical produced by the crosslinking agent to stimulate crosslinking reaction, and if the ratio of the number of trivinyl groups with respect to the number of functional groups per 1000 carbon atoms is a certain ratio or more, crosslinking properties may become excellent.

The ethylene/alpha-olefin copolymer according to the present invention may maintain the trivinyl content to a certain ratio or more as described above, and narrow molecular weight distribution, excellent crosslinking properties and consequent optical properties may be shown.

For example, the Rev value may be 0.08 or more, or 0.10 or more, or 0.12 or more, or 0.15 or more, and 0.30 or less, 0.29 or less, or 0.27 or less, or 0.26 or less, or 0.25 or less. If the trivinyl content satisfies the above-described numerical range, narrow molecular weight distribution, excellent crosslinking properties and consequent optical properties may be shown.

In addition, the ethylene/alpha-olefin copolymer of the present invention may preferably satisfy the $R_v$ value, $R_v$a value and/or Rev value and at the same time have the number of unsaturated functional groups including vinyl, trivinyl, vinylene and vinylidene in the copolymer of 0.65 or less per 1000 carbon atoms. Particularly, 0.6 or less, or 0.5 or less, or 0.45 or less, or 0.4 or less, and 0.1 or more, or 0.15 or more, or 0.2 or more, or 0.23 or more. If the number of the unsaturated functional groups satisfies the above-described numerical range, narrow molecular weight distribution, excellent crosslinking properties and consequent optical properties may be shown.

In addition, the number of the vinyl functional groups in the copolymer may be 0.3 or less per 1000 carbon atoms. Particularly, 0.29 or less, or 0.25 or less, or 0.2 or less, or 0.15 or less, or 0.1 or less, and 0.01 or more, or 0.02 or more, or 0.04 or more, or 0.06 or more. If the number of the unsaturated functional groups satisfies the above-described numerical range, narrow molecular weight distribution, excellent crosslinking properties and consequent optical properties may be shown.

In addition, the number of the vinylene functional groups in the copolymer per 1000 carbon atoms may be 0.3 or less, or 0.29 or less, or 0.25 or less, or 0.2 or less, or 0.15 or less, or 0.1 or less, and 0.01 or more, or 0.02 or more, or 0.04 or more, or 0.06 or more. If the number of the unsaturated functional groups satisfies the above-described numerical range, narrow molecular weight distribution, excellent crosslinking properties and consequent optical properties may be shown.

In addition, the number of the vinylidene functional groups in the copolymer may be 0.07 or less, or 0.05 or less, and 0.01 or more, or 0.02 or more per 1000 carbon atoms. If the number of the unsaturated functional groups satisfies the above-described numerical range, narrow molecular weight distribution, excellent crosslinking properties and consequent optical properties may be shown.

In addition, the number of the trivinyl functional groups in the copolymer may be 0.15 or less, or 0.1 or less, or 0.08 or less, and 0.01 or more, or 0.02 or more per 1000 carbon atoms. If the number of the unsaturated functional groups satisfies the above-described numerical range, narrow molecular weight distribution, excellent crosslinking properties and consequent optical properties may be shown.

In the present invention, the vinyl group has a structure of R—CH═$CH_2$, the trivinyl group has a structure of RCH═CR'R", the vinylene has a structure of RCH═CHR' (E form) or RCH═CHR' (Z form), and the vinylidene has a structure of RR'C═$CH_2$. Here, R, R' and R" may be each independently a polymer chain or a branch chain according to alpha-olefin which is a comonomer.

In the present invention, the contents of the vinyl, vinylidene, vinylene and trivinyl in the copolymer may be calculated from the NMR analysis results. Particularly, measurement may be conducted after dissolving the copolymer in a 1,1,2,2-tetrachloroethane D2 (TCE-d2) solvent using Bruker AVANCE III 500 MHz NMR equipment at 393 K. In 1H NMR spectrum, the amount ratio of a comonomer is calculated by calibrating a TCE-d2 peak to 6.0 ppm, and using integration values in 1.4 ppm and 0.96 ppm regions. The contents of a vinyl group, vinylidene group, vinylene group and trivinyl group observed at 4.7 ppm-5.6 ppm are calculated, respectively (analysis method: AMT-3863). Peak assignment refers to a document [*Macromolecules* 2014, 47, 3282-3790].

In addition, the ethylene/alpha-olefin copolymer according to an embodiment of the present invention may have a crystallization temperature (Tc) of 35° C. to 80° C. More particularly, the crystallization temperature may be 40° C. or more, or 45° C. or more, and 75° C. or less, or 70° C. or less, or 65° C. or less. As described above, the high crystallization temperature is due to the uniform distribution of a comonomer in the ethylene/alpha-olefin copolymer, and with the temperature range, excellent structural stability may be shown.

In addition, the ethylene/alpha-olefin copolymer according to an embodiment of the present invention may have a melting temperature (Tm) of 50 to 110° C. More particularly, the melting temperature may be 55° C. or more, or 60° C. or more, or 70° C. or more, and 110° C. or less, or 105° C. or less, or 95° C. or less. As described above, with the melting temperature in the temperature range, excellent thermal stability may be shown.

In the present invention, the crystallization temperature and melting temperature of the ethylene/alpha-olefin copolymer may be measured using a differential scanning calorimeter (DSC). Particularly, the copolymer is heated to 150° C., kept for 5 minutes, cooled to 20° C. again, and heated again. In this case, the temperature elevating rate and decreasing rate are controlled to 10° C./min, respectively, and the results measured in a section where the temperature is secondly elevated is set to the melting temperature, and the results measured in a section where the temperature is decreased is set to the crystallization temperature.

In addition, in the ethylene/alpha-olefin copolymer according to an embodiment of the present invention, the alpha-olefin-based monomer which is the comonomer may be a C4-20 olefin-based monomer. Particular example may include propylene, 1-butene, 1-pentene, 4-methyl-1-pentene, 1-hexene, 1-heptene, 1-octene, 1-decene, 1-undecene, 1-dodecene, 1-tetradecene, 1-hexadecene, or 1-eicocene, and these may be used alone or as a mixture of two or more.

Among them, the alpha-olefin monomer may be 1-butene, 1-hexene or 1-octene considering the remarkable improving effects if applied to a resin composition for an optical film, and most preferably, 1-butene may be used.

In addition, in the ethylene/alpha-olefin copolymer, the amount of the alpha-olefin which is a comonomer may be appropriately selected from a range satisfying the above-described physical property conditions, and may particularly greater than 0 and 99 mol % or less, or 10 to 50 mol %.

2. Method for Preparing ethylene/alpha-olefin copolymer

Another embodiment of the present invention provides a method for preparing an ethylene/alpha-olefin copolymer, including a step of polymerizing ethylene and an alpha-olefin monomer by injecting hydrogen in 5 to 100 cc/min in the presence of a catalyst composition including a transition metal compound of the following Formula 1:

[Formula 1]

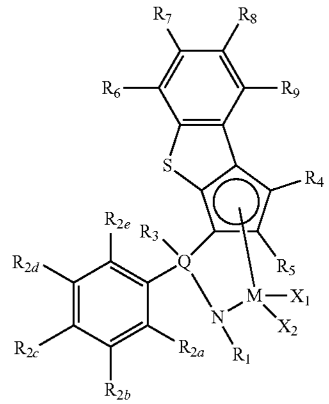

In Formula 1, $R_1$ is hydrogen; C1-20 alkyl; C3-20 cycloalkyl; C2-20 alkenyl; C1-20 alkoxy; C6-20 aryl; C7-20 arylalkoxy; C7-20 alkylaryl; or C7-20 arylalkyl, $R_{2a}$ to $R_{2e}$ are each independently hydrogen; halogen; C1-20 alkyl; C3-20 cycloalkyl; C2-20 alkenyl; C1-20 alkoxy; or C6-20 aryl, $R_3$ is hydrogen; halogen; C1-20 alkyl; C3-20 cycloalkyl; C2-20 alkenyl; C6-20 aryl; C7-20 alkylaryl; C7-20 arylalkyl; C1-20 alkyl amino; C6-20 aryl amino; or phenyl which is substituted with one or more selected from the group consisting of halogen, C1-20 alkyl, C3-20 cycloalkyl, C2-20 alkenyl, C1-20 alkoxy and C6-20 aryl, $R_4$ to $R_9$ are each independently hydrogen; silyl; C1-20 alkyl; C3-20 cycloalkyl; C2-20 alkenyl; C6-20 aryl; C7-20 alkylaryl; C7-20 arylalkyl; or a metalloid radical of a metal in group 14 which is substituted with C1-20 hydrocarbyl; among the $R_6$ to $R_9$, adjacent two or more may be connected with each other to form a ring, Q is Si, C, N, P or S, M is a transition metal in group 4, and $X_1$ and $X_2$ are each independently hydrogen; halogen; C1-20 alkyl; C3-20 cycloalkyl; C2-20 alkenyl; C6-20 aryl; C7-20 alkylaryl; C7-20 arylalkyl; C1-20 alkylamino; or C6-20 arylamino.

In the transition compound of Formula 1 according to an embodiment of the present invention, $R_1$ may be hydrogen; C1-20 alkyl; C3-20 cycloalkyl; C1-20 alkoxy; C6-20 aryl; C7-20 arylalkoxy; C7-20 alkylaryl; or C7-20 arylalkyl, $R_{2a}$ to $R_{2e}$ may be each independently hydrogen; halogen; C1-12 alkyl; C3-12 cycloalkyl; C2-12 alkenyl; C1-12 alkoxy; or phenyl, $R_3$ may be hydrogen; halogen; C1-12 alkyl; C3-12 cycloalkyl; C2-12 alkenyl; C6-20 aryl; C7-13 alkylaryl; C7-13 arylalkyl; or phenyl which is substituted with one or more selected from the group consisting of halogen, C1-12 alkyl, C3-12 cycloalkyl, C2-12 alkenyl, C1-12 alkoxy and phenyl, $R_4$ to $R_9$ may be each independently hydrogen; C1-20 alkyl; C3-20 cycloalkyl; C6-20 aryl; C7-20 alkylaryl; or C7-20 arylalkyl, two or more adjacent to each other among $R_6$ to $R_9$ may be connected with each other to form a C5-20 aliphatic ring or a C6-20 aromatic ring; the aliphatic ring or the aromatic ring may be substituted with halogen, C1-20 alkyl, C2-12 alkenyl, or C6-12 aryl, Q may be Si, M may be Ti, and $X_1$ and $X_2$ may be each independently hydrogen;

halogen; C1-12 alkyl; C3-12 cycloalkyl; C2-12 alkenyl; C6-12 aryl; C7-13 alkylaryl; C7-13 arylalkyl; C1-13 alkylamino; or C6-12 arylamino.

In addition, in the transition metal compound of Formula 1 according to another embodiment of the present invention, $R_1$ may be hydrogen; C1-12 alkyl; C3-12 cycloalkyl; C1-12 alkoxy; C6-12 aryl; C7-13 arylalkoxy; C7-13 alkylaryl; or C7-13 arylalkyl, $R_{2a}$ to $R_{2e}$ may be each independently hydrogen; halogen; C1-12 alkyl; C3-12 cycloalkyl; C2-12 alkenyl; C1-12 alkoxy; or phenyl, $R_3$ may be hydrogen; halogen; C1-12 alkyl; C3-12 cycloalkyl; C2-12 alkenyl; C7-13 alkylaryl; C7-13 arylalkyl; phenyl; or phenyl which is substituted with one or more selected from the group consisting of halogen, C1-12 alkyl, C3-12 cycloalkyl, C2-12 alkenyl, C1-12 alkoxy and phenyl, $R_4$ to $R_9$ may be each independently hydrogen; C1-12 alkyl; C3-12 cycloalkyl; C6-12 aryl; C7-13 alkylaryl; or C7-13 arylalkyl, two or more adjacent to each other among $R_6$ to $R_9$ may be connected with each other to form a C5-12 aliphatic ring or a C6-12 aromatic ring;

the aliphatic ring or aromatic ring may be substituted with halogen, C1-12 alkyl, C2-12 alkenyl, or C6-12 aryl, Q may be Si, M may be Ti, and $X_1$ and $X_2$ may be each independently hydrogen; halogen; a C1-12 alkyl group; or C2-12 alkenyl.

In addition, in the transition metal compound of Formula 1 according to another embodiment of the present invention, $R_1$ may be hydrogen or C1-12 alkyl, $R_{2a}$ to $R_{2e}$ may be each independently hydrogen; C1-12 alkyl; or C1-12 alkoxy, $R_3$ may be hydrogen; C1-12 alkyl; or phenyl, $R_4$ and $R_5$ may be each independently hydrogen; or C1-12 alkyl, $R_6$ to $R_9$ may be each independently hydrogen or methyl, Q may be Si, M may be Ti, and $X_1$ and $X_2$ may be each independently hydrogen or C1-12 alkyl.

The transition metal compound of Formula 1 forms a structure in which cyclopentadiene fuses with benzothiophene via a cyclic type bond, and an amido group ((N—$R_1$) are stably crosslinked by Q (Si, C, N or P), and a transition metal in group 4 makes a coordination bond. If the catalyst composition is applied for polymerizing an olefin, the production of a polyolefin having properties such as high activity, a high molecular weight and a high copolymerization degree at a high polymerization temperature is possible.

Further, in the transition metal compound of Formula 1, as the amido group (N—$R_1$) is crosslinked by Q (Si, C, N, P), since Q is bonded to a substituted or unsubstituted phenyl group, more stable crosslinking may be achieved and electronically excellent stability may be achieved when making coordination bond with a transition metal.

In addition, since the phenyl group which is a bulky substituent is positioned around a central metal, β-hydrogen transfer is restrained, and an olefin polymer having an even higher molecular weight may be prepared and excellent copolymerization properties may be achieved.

That is, the transition metal compound is used but an optimized amount of hydrogen is injected during polymerization reaction in the present invention, and thus, an ethylene/alpha-olefin copolymer having narrow molecular weight distribution and excellent crosslinking properties may be provided. Due to the electronic/structural stability of the transition metal compound, the inclusion of hydrogen is advantageous. In addition, since the initial molecular weight of a polymer formed by the injection of a catalyst prior to injecting hydrogen, after injecting hydrogen, the preparation of a product having narrow molecular weight distribution and a high molecular weight is also possible.

The compound represented by Formula 1 may be any one among the compounds represented by the following formulae:

[Formula 1-1]

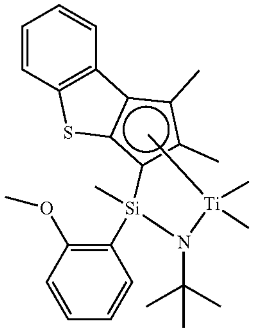

[Formula 1-2]

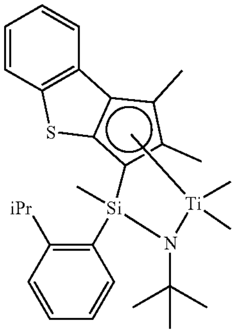

-continued

[Formula 1-3]

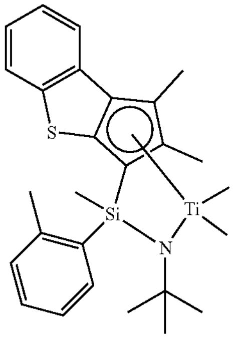

[Formula 1-4]

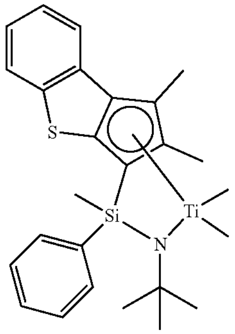

[Formula 1-5]

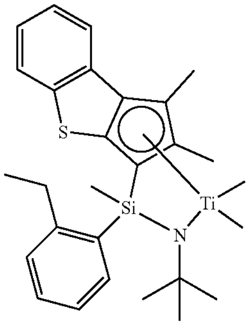

[Formula 1-6]

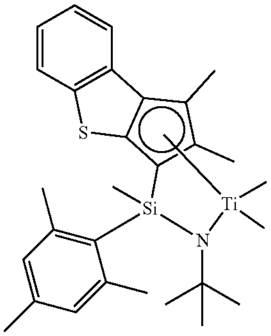

-continued

[Formula 1-7]

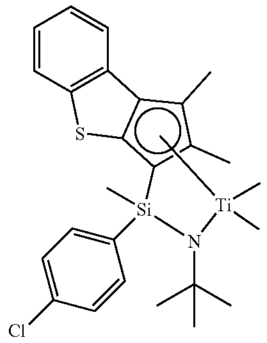

[Formula 1-8]

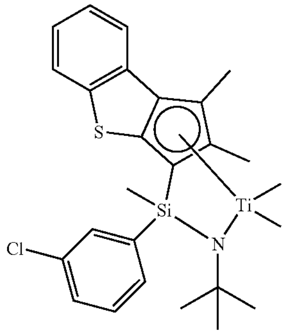

[Formula 1-9]

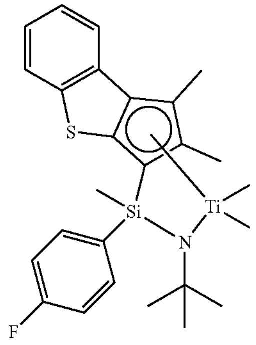

[Formula 1-10]

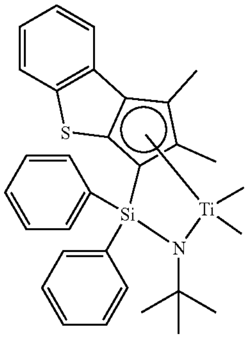

Meanwhile, in the preparation of the ethylene/alpha-olefin copolymer according to an embodiment of the present invention, the catalyst composition may further include a promoter for activating the transition metal compound of Formula 1 above.

The promoter is an organometal compound including a metal in group 13, and particularly may include one or more among a compound of the following Formula 2, a compound of the following Formula 3 and a compound of the following Formula 4:

[Formula 2]

$$R_{41}-[Al(R_{42})-O]_n-R_{43}$$

In Formula 2, $R_{41}$, $R_{42}$ and $R_{43}$ are each independently any one among hydrogen, halogen, a hydrocarbyl group of 1 to 20 carbon atoms, and a halogen-substituted hydrocarbyl group of 1 to 20 carbon atoms, and n is an integer of 2 or more.

[Formula 3]

$$D(R_{44})_3$$

In Formula 3, D is aluminum or boron, and each $R_{44}$ is independently any one among halogen, a hydrocarbyl group of 1 to 20 carbon atoms, and a halogen-substituted hydrocarbyl group of 1 to 20 carbon atoms.

[Formula 4]

$$[L-H]^+[Z(A)_4]^- \quad \text{or} \quad [L]^+[Z(A)_4]^-$$

In Formula 4,

L is a neutral or a cationic Lewis acid; H is a hydrogen atom, and

Z is an element in group 13, and each A is independently a hydrocarbyl group of 1 to 20 carbon atoms; or a hydrocarbyloxy group of 1 to 20 carbon atoms, of which one or more hydrogen atoms are substituted with one or more substituents among halogen, a hydrocarbyloxy group of 1 to 20 carbon atoms, and a hydrocarbylsilyl group of 1 to 20 carbon atoms.

More particularly, the compound of Formula 2 may be an alkylaluminoxane-based compound in which repeating units are combined into a linear, circular or network type, and particular examples may include methylaluminoxane (MAO), ethylaluminoxane, isobutylaluminoxane or tert-butylalminoxane.

In addition, particular examples of the compound of Formula 3 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron or tributylboron, and particularly, may be selected from trimethylaluminum, triethylaluminum or triisobutylaluminum.

In addition, the compound of Formula 4 may include a trisubstituted ammonium salt, dialkyl ammonium salt, or trisubstituted phosphonium type borate-based compound. More particular examples may include a trisubstituted ammonium salt type borate-based compound such as trimetalammonium tetraphenylborate, methyldioctadecylammonium tetraphenylborate, triethylammonium tetraphenylborate, tripropylammonium tetraphenylborate, tri(n-butyl)ammonium tetraphenylborate, methyltetradecyclooctadecylammonium tetraphenylborate, N,N-dimethylanilium tetraphenylborate, N,N-diethylanilium tetraphenylborate, N,N-dimethyl(2,4,6-trimethylanilium)tetraphenylborate, trimethylammonium tetrakis(pentafluorophenyl) borate, methylditetradecylammonium tetrakis (pentafluorophenyl)borate, methyldioctadecylammonium tetrakis(pentafluorophenyl)borate, triethylammonium, tetrakis(pentafluorophenyl)borate, tripropylammoniumtetrakis (pentafluorophenyl)borate, tri(n-butyl)ammonium tetrakis (pentafluorophenyl)borate, tri(sec-butyl)ammoniumtetrakis (pentafluorophenyl)borate, N,N-dimethylanilium tetrakis (pentafluorophenyl)borate, N,N-diethylaniliumtetrakis (pentafluorophenyl)borate, N,N-dimethyl (2,4,6-trimethylanilium)tetrakis(pentafluorophenyl)borate, trimethylammoniumtetrakis(2,3,4,6-tetrafluorophenyl)borate, triethylammonium tetrakis(2,3,4,6-tetrafluorophenyl) borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilium tetrakis(2,3,4,6-tetrafluorophenyl)borate, N,N-diethylanilium tetrakis(2,3,4,6-tetrafluorophenyl)borate, N,N-dimethyl-(2,4,6-trimethylanilium)tetrakis-(2,3,4,6-tetrafluorophenyl)borate, etc.; a dialkylammonium salt type borate-based compound such as dioctadecylammonium tetrakis(pentafluorophenyl)borate, ditetradecylammonium tetrakis(pentafluorophenyl)borate, dicyclohexylammonium tetrakis(pentafluorophenyl)borate, etc.; or a trisubstituted phosphonium salt type borate-based compound such as triphenylphosphonium tetrakis(pentafluorophenyl)borate, methyldioctadecylphosphonium tetrakis(pentafluorophenyl) borate, tri(2,6-dimethylphenyl)phosphoniumtetrakis(pentafluorophenyl)borate, etc.

By using such a promoter, the molecular weight distribution of a finally prepared ethylene/alpha-olefin copolymer may become more uniform, and polymerization activity may be improved.

The promoter may be used in an appropriate amount so that the activation of the transition metal compound of Formula 1 may be sufficiently performed.

In addition, the catalyst composition may include the transition metal compound of Formula 1 in a supported state on a support.

If the transition metal compound of Formula 1 is supported on the support, the weight ratio of the transition metal compound to the support may be 1:10 to 1:1,000, more preferably, 1:10 to 1:500. If the support and the transition metal compound are included in the weight ratio range, an optimized shape may be shown. In addition, if the promoter is supported together on the support, the weight ratio of the promoter to the support may be 1:1 to 1:100, more preferably, 1:1 to 1:50. If the promoter and the support are included in the weight ratio, catalyst activity may be improved, and the minute structure of the polymer thus prepared may be optimized.

Meanwhile, the support may use silica, alumina, magnesia or a mixture thereof, or these materials may be used after removing moisture from the surface by drying at a high temperature, in a state where a hydroxyl group or a siloxane group, which have high reactivity, are included. In addition, the support dried at a high temperature may further include an oxide, a carbonate, a sulfate, or a nitrate component, for example, $Na_2O$, $K_2CO_3$, $BaSO_4$ and $Mg(NO_3)_2$.

The drying temperature of the support is preferably, from 200 to 800° C., more preferably, from 300 to 600° C., most preferably, from 300 to 400° C. If the drying temperature of the support is less than 200° C., humidity is too high and water at the surface may react with the promoter, and if the temperature is greater than 800° C., the pores at the surface of the support may be combined to decrease the surface area, and a large amount of the hydroxyl groups at the surface may be removed to remain only siloxane groups to decrease reaction sites with the promoter, undesirably.

In addition, the amount of the hydroxyl group at the surface of the support may preferably be 0.1 to 10 mmol/g, and more preferably, 0.5 to 5 mmol/g. The amount of the hydroxyl group at the surface of the support may be controlled by the preparation method and conditions of the support, or drying conditions such as temperature, time, vacuum and spray drying.

Meanwhile, the polymerization reaction of the ethylene/alpha-olefin copolymer may be performed by continuously injecting hydrogen and continuously polymerizing ethylene and an alpha-olefin-based monomer in the presence of the catalyst composition.

In this case, the hydrogen gas restrains the rapid reaction of the transition metal compound at an initial stage of polymerization and plays the role of terminating polymerization reaction. Accordingly, by the use of such hydrogen gas and the control of the amount thereof used, an ethylene/alpha-olefin copolymer having narrow molecular weight distribution and the vinyl content in the copolymer controlled to a certain range may be effectively prepared.

For example, the hydrogen gas may be injected in 5 cc/min or more, or 7 cc/min or more, or 10 cc/min or more, or 15 cc/min or more, or 19 cc/min or more, or 22 cc/min or more, and 100 cc/min or less, or 50 cc/min or less, or 45 cc/min or less, or 35 cc/min or less, or 29 cc/min or less. If the hydrogen gas is injected under the above-described conditions, the ethylene/alpha-olefin polymer thus prepared may accomplish the physical properties in the present invention. If the hydrogen gas is injected in an amount less than 5 cc/min, the termination of the polymerization reaction may not homogeneously carried out, and the preparation of an ethylene/alpha-olefin copolymer having desired physical properties may become difficult, and if the amount is greater than 100 cc/min, the terminating reaction may arise excessively fast, and an ethylene/alpha-olefin copolymer having an excessively small molecular weight may be prepared.

In addition, the polymerization reaction may be performed at 80 to 200° C., but by controlling the injection amount of the hydrogen together with the polymerization temperature, the vinyl group content in the ethylene/alpha-olefin copolymer may be controlled even more advantageously. Accordingly, particularly, the polymerization reaction temperature may be 100° C. or more, or 120° C. or more, or 140° C. or more, and 190° C. or less, or 180° C. or less, or 170° C. or less, or 160° C. or less.

In addition, during the polymerization reaction, an organoaluminum compound is further injected to remove moisture in a reactor, and the polymerization reaction may be performed in the presence of the compound. Particular examples of such organoaluminum compound may include trialkyl aluminum, dialkyl aluminum halide, alkyl aluminum dihalide, aluminum dialkyl hydride or alkyl aluminum sesquihalide, etc., and more particular examples may include $Al(C_2H_5)_3$, $Al(C_2H_5)_2H$, $Al(C_3H_7)_3$, $Al(C_3H_7)_2H$, $Al(i\text{-}C_4H_9)_2H$, $Al(C_8H_{17})_3$, $Al(C_{12}H_{25})_3$, $Al(C_2H_5)(C_{12}H_{25})_2$, $Al(i\text{-}C_4H_9)(C_{12}H_{25})_2$, $Al\ (i\text{-}C_4H_9)_2H$, $Al(i\text{-}C_4H_9)_3$, $(C_2H_5)_2AlCl$, $(i\text{-}C_3H_9)_2AlCl$ or $(C_2H_5)_3Al_2C_{13}$. Such an organoaluminum compound may be continuously injected into the reactor, and in order for appropriate removal of humidity, the organoaluminum compound may be injected in a ratio of about 0.1 to 10 mole per 1 kg of a reaction medium injected into the reactor.

In addition, a polymerization pressure may be about 1 to about 100 $Kgf/cm^2$, preferably, about 70 to about 96 $Kgf/cm^2$, more preferably, about 80 to about 93 $Kgf/cm^2$.

In addition, if a transition metal compound is used in a supported state on a support, the transition metal compound may be injected after being dissolved or diluted in an aliphatic hydrocarbon solvent of 5 to 12 carbon atoms, for example, pentane, hexane, heptane, nonane, decane, and isomers thereof, an aromatic hydrocarbon solvent such as toluene and benzene, a chlorine atom-substituted hydrocarbon solvent such as dichloromethane and chlorobenzene, etc. The solvent used herein is preferably used after removing a small amount of water or air, which acts as a catalyst poison, by treating with a small amount of alkyl aluminum, and a promoter may be further used.

3. Resin Composition for Optical Film

Another embodiment of the present invention provides a resin composition for an optical film, including the ethylene/alpha-olefin copolymer of the present invention. The resin composition for an optical film of the present invention may be extruded into a sheet or film shape, without specific limitation.

The resin composition for an optical film of the present invention may show an excellent crosslinking degree. For example, the crosslinking degree of the resin composition for an optical film may be 55% or more, or 58% or more, or 63% or more, or 67% or more, or 69% or more.

The glass transition temperature of the resin composition for an optical film of the present invention may be −55° C. to −45° C., or −53° C. to −42° C., or −50° C. to −40° C.

In addition, as a result of the measurement of yellow index (YI) and total light transmittance (Tt) before and after the crosslinking of an ethylene/alpha-olefin copolymer, the resin composition for an optical film of the present invention may satisfy numerical ranges of the yellow index (YI) and the total light transmittance (Tt) after crosslinking, which are appropriate to be used in an optical film.

Particularly, the yellow index (hereinafter, YI) value of the resin composition for an optical film of the present invention may be 0.5 or more, or 1.0 or more, or 1.25 or more, or 1.30 or more, and 5.5 or less, or 4.9 or less, or 4.5 or less, or 3.9 or less, or 2.9 or less, or 1.5 or less, or 1.2 or less. Lower YI values guarantee the quality stability of an optical film.

Particularly, if the yellow index is measured after performing crosslinking with respect to the resin composition for an optical film of the present invention, even better values may be shown. For example, the yellow index after performing the crosslinking may be 0.5 or more, or 0.7 or more, or 0.9 or more, or 1.0 or more, and 1.5 or less, or 1.48 or less, or 1.3 or less, or 1.2 or less.

The yellow index is a quantification value of yellowing phenomenon of the resin composition if exposed to ultraviolet rays, and may be measured based on ASTM D1925 using UV/Vis spectrometer. For example, the reflectance of the resin composition in a wavelength region of 400 nm to 700 nm is measured using the UV/Vis spectrometer, and by using the value, the yellow index value may be calculated by the following Equation 4:

$$YI = [100(1.28XCIE - 1.06ZCIE)]/YCIE \quad \text{[Formula 4]}$$

In Equation 4, YI is a value calculated using a color difference analysis program using a UV/VIS/NIR spectrometer, and XCIE, YCIE, and ZCIE are relative values representing red, green and blue color coordinates, respectively.

In addition, the resin composition for an optical film of the present invention may have excellent light transmittance. In an embodiment, total light transmittance (Tt) measured using a haze meter after crosslinking the resin composition of a sheet shape at a temperature of 150° C. may satisfy the following Equation 5:

$$Tt \geq 90.0\% \qquad \text{[Formula 5]}$$

The total light transmittance may be a measured value using a haze meter with respect to a wavelength of light of 200 nm or more, for example, a wavelength of light of 300 nm, 350 nm, 400 nm, 450 nm, 500 nm, 550 nm or 600 nm, preferably, may be a measured value using a haze meter with respect to a light of a wavelength of 550 nm. The total light transmittance of the resin composition thus measured represents the total light transmittance after crosslinking the resin composition of a sheet shape, and the resin composition of a sheet shape may be laminated through a vacuum laminator.

The total light transmittance of the resin composition for an optical film of the present invention, as a measured value after crosslinking the resin composition of a sheet shape at a temperature of 150° C. may be 90% or more, or 90.2% or more, or 90.5% or more, or 90.9% or more, or 91% or more, or 92% or more. In addition, considering the photoelectric efficiency of an optical device, the total light transmittance may be controlled in the above-described range.

In addition, by using the resin composition for an optical film of the present invention, a modified resin composition, for example, a silane modified resin composition or an amino silane modified resin composition may be prepared.

For example, the resin composition for an optical film of the present invention may additionally include a known unsaturated silane compound, amino silane compound, crosslinking agent and crosslinking coagent in addition to the ethylene/alpha-olefin copolymer of the present invention.

The unsaturated silane compound may be grafted into a main chain including a polymerization unit of the monomer of the copolymer of the present invention in the presence of a radical initiator to be included in a polymerized state into a silane modified resin composition or an amino silane modified resin composition.

In an embodiment, the unsaturated silane compound may be vinyltrimethoxy silane, vinyltriethoxy silane, vinyltripropoxy silane, vinyltriisopropoxy silane, vinyltributoxy silane, vinyltripentoxy silane, vinyltriphenoxy silane, vinyltriacetoxy silane, or the like, and in an embodiment, the vinyltrimethoxy silane or the vinyltriethoxy silane may be used among them, without limitation.

In addition, the amino silane compound may further improve adhesion strength with the back side sheet composed of upper and lower glass substrates or a fluorine resin, by acting as a catalyst promoting hydrolysis reaction transforming a reactive functional group such as an alkoxy group of an unsaturated silane compound, for example, vinyltriethoxy silane, which is grafted into the copolymer of the present invention, into a hydroxyl group in the grafting modification step of an ethylene/alpha-olefin copolymer. At the same time, the amino silane compound participates directly in a copolymerization reaction as a reactant, and a moiety having an amine functional group in an amino silane modified resin composition may be provided.

The amino silane compound may be any silane compounds including an amine group as long as it is a primary amine and a secondary amine, without specific limitation. For example, as the amino silane compound, aminotrialkoxysilane, aminodialkoxysilane, etc., may be used, and the example thereof may include one or more selected from the group consisting of 3-aminopropyltrimethoxysilane (APTMS), 3-aminopropyltriethoxysilane (APTES), bis[(3-triethoxysilyl)propyl]amine, bis[(3-trimethoxysilyl)propyl] amine, 3-aminopropylmethyldiethoxysilane, 3-aminopropylmethyldimethoxysilane, N-[3-(trimethoxysilyl)propyl] ethylenediamine (DAS), aminoethylaminopropyltriethoxysilane, aminoethylaminopropylmethyldimethoxysilane, aminoethylaminopropylmethyldiethoxysilane, aminoethylaminomethyltriethoxysilane, aminoethylaminomethylmethyldiethoxysilane, diethylenetriaminopropyltrimethoxysilane, diethylenetriaminopropyltriethoxysilane, diethylenetriaminopropylmethyldimethoxysilane, diethyleneaminomethylmethyldiethoxysilane, (N-phenylamino) methyltrimethoxysilane, (N-phenylamino)methyltriethoxysilane, (N-phenylamino)methylmethyldimethoxysilane, (N-phenylamino)methylmethyldiethoxysilane, 3-(N-phenylamino)propyltrimethoxysilane, 3-(N-phenylamino)propyltriethoxysilane, 3-(N-phenylamino)propylmethyldimethoxysilane, 3-(N-phenylamino)propylmethyldiethoxysilane, and N—(N-butyl)-3-aminopropyltrimethoxysilane. The amino silane compounds may be used alone or as a mixture type.

In the resin composition, the amounts of the unsaturated silane compound and/or amino silane compound are not specifically limited.

The crosslinking agent is a radical initiator in the preparation step of the silane modified resin composition and may play the role of initiating the grafting reaction of the unsaturated silane compound into the resin composition. In addition, by forming a crosslinking bond in the silane modified resin composition or between the silane modified resin composition and an unmodified resin composition in the step of lamination during manufacturing an optoelectronic device, the heat resistance and durability of a final product, for example, an encapsulant sheet may be improved.

The crosslinking agent may use various crosslinking agents known in the art as long as it may be a crosslinking agent which may initiate the radical polymerization of a vinyl group or form a crosslinking bond, for example, one or two or more selected from the group consisting of an organic peroxide, a hydroperoxide and an azo compound may be used.

Particularly, one or more selected from the group consisting of dialkyl peroxides such as t-butylcumylperoxide, di-t-butyl peroxide, di-cumyl peroxide, 2,5-dimethyl-2,5-di (t-butylperoxy) hexane, and 2,5-dimethyl-2,5-di(t-butylperoxy)-3-hexyne; hydro peroxides such as cumene hydroperoxide, diisopropyl benzene hydro peroxide, 2,5-dimethyl-2,5-di(hydroperoxy)hexane, and t-butylhydroperoxide; diacylperoxides such as bis-3,5,5-trimethylhexanoyl peroxide, octanoylperoxide, benzoyl peroxide, o-methylbenzoylperoxide, and 2,4-dichlorobenzoyl peroxide; peroxy esters such as t-butylperoxy iso butyrate, t-butylperoxy acetate, t-butylperoxy-2-ethylhexanoate, t-butylperoxy pivalate, t-butylperoxy octoate, t-butylperoxyisopropyl carbonate, t-butylperoxybenzoate, di-t-butylperoxyphthalate, 2,5-dimethyl-2,5-di(benzoylperoxy)hexane, and 2,5-dimethyl-2,5-di(benzoylperoxy)-3-hexyne; ketone peroxides such as methyl ethyl ketone peroxide, and cyclohexanone peroxide; lauryl peroxide; and azo compounds such as azobisisobutyronitrile and azobis(2,4-dimethylvaleronitrile), may be used, without limitation.

The organic peroxide may be an organic peroxide having a one-hour half-life temperature of 120° C. to 135° C., for example, 120° C. to 130° C., 120° C. to 125° C., preferably, 121° C. In the above, "one-hour half-life temperature" means a temperature at which the half-life of the crosslinking agent becomes one hour. According to the one hour half-life temperature, the temperature at which the radical initiation reaction is efficiently carried out is changed, and accordingly, if an organic peroxide having the one hour half-life temperature in the above-described range is used as the crosslinking agent, radical initiation reaction, that is, crosslinking reaction may be effectively performed at a lamination process temperature for manufacturing a optoelectronic device.

The crosslinking agent may be included in an amount of 0.01 to 1 parts by weight, for example, 0.05 to 0.55, 0.1 to 0.5, or 0.15 to 0.45 parts by weight based on 100 parts by weight of the resin composition, and if the crosslinking agent is included in less than 0.01 parts by weight, improving effect of heat resistance is insignificant, and if the amount is greater than 1 part by weight, the moldability of an encapsulant sheet may decrease, and thus, defects of generating process limitation may arise, and the physical properties of the encapsulant may be adversely affected.

In addition, the resin composition of the present invention may include a crosslinking coagent in addition to the crosslinking agent. By including the crosslinking coagent in the resin composition, the crosslinking degree of the resin composition by the above-described crosslinking agent may be increased, and accordingly, a final product, for example, the heat resistance and durability of an encapsulant sheet may be even further improved.

The crosslinking coagent may be included in an amount of 0.01 to 0.5 parts by weight, for example, 0.01 to 0.3, 0.015 to 0.2, or 0.016 to 0.16 parts by weight based on 100 parts by weight of the resin composition, and if the crosslinking coagent is included in less than 0.01 parts by weight, the improving effect of heat resistant properties may be insignificant, and if the amount is greater than 0.5 parts by weight, defects of affecting the physical properties of a final product, for example, an encapsulant sheet may arise, and production cost may increase.

The crosslinking coagent may use various known crosslinking coagents in the art, for example, a compound including at least one unsaturated group such as an allyl group and a (meth)acryloxy group, may be used as the crosslinking coagent.

The compound containing the allyl group may include, for example, poly allyl compounds such as triallyl isocyanurate, triallyl cyanurate, diallyl phthalate, diallyl fumarate and diallyl maleate, and the compound containing the (meth) acryloxy group may include, for example, ethylene glycol diacrylate, ethylene glycol dimethacrylate, trimethylolpropane trimethacrylate, t-butyl-1-(2-ethylhexyl)monoperoxycarbonate (TBEC), methacryloxypropyltrimethoxysilane (MEMO), etc., without specific limitation.

In addition, the resin composition of the present invention may additionally include one or more kinds of additives selected from a light stabilizer, a UV absorber and a heat stabilizer as necessary.

The light stabilizer may capture an active species for initiating the photo-induced degradation of a resin according to the use of the composition applied to play the role of preventing photooxidation. The kind of the light stabilizer used is not specifically limited, for example, known compounds such as a hindered amine-based compound and a hindered piperidine-based compound may be used.

The UV absorber, according to the use of the composition, may absorb ultraviolet rays from the sunlight, etc. and transform into harmless thermal energy in a molecule, and may play the role of preventing the excitation of the active species for initiating the photo-induced degradation in the resin composition. Particular kinds of the UV absorber used is not specifically limited, but, for example, benzophenone-based, benzotriazole-based, acrylonitrile-based, metal complex-based, hindered amine-based, inorganic UV absorber such as ultrafine titanium oxide particles and ultrafine zinc oxide particles may be used alone, or a mixture of two or more thereof may be used.

In addition, examples of the heat stabilizer may include a phosphor-based heat stabilizer such as tris(2,4-di-tert-butylphenyl)phosphite, bis[2,4-bis(1,1-dimethylethyl)-6-methylphenyl]ethylester phosphorous acid, tetrakis(2,4-di-tert-butylphenyl) [1,1-biphenyl]-4,4'-diylbisphosphonate and bis(2,4-di-tert-butylphenyl)pentaerythritoldiphosphite; and a lactone-based heat stabilizer such as a reaction product of 8-hydroxy-5,7-di-tert-butyl-furan-2-on and o-xylene, and one or two or more thereof may be used.

In the resin composition, the amounts of the light stabilizer, UV absorber and/or heat stabilizer are not specifically limited. That is, the amount of the additive may be appropriately selected considering the use of the resin composition, the shape or density of the additive, etc., and generally, may be appropriately controlled in a range of 0.01 parts by weight to 5 parts by weight with respect to 100 parts by weight of the total solid content of the resin composition.

In addition, the resin composition may additionally and appropriately include various additives known in the art according to the use of the resin component applied in addition to the components.

In addition, the resin composition for an optical film of the present invention may be used as an encapsulant for encapsulating a device in various optoelectronic devices, but an embodiment is not limited thereto. For example, the resin composition may be used as a material for industry applied to a lamination process with heating, etc.

4. Optical Film

Another embodiment of the present invention provides an optical film including the resin composition.

The optical film of the present invention may be manufactured by molding the resin composition into a film or a sheet shape. The molding method is not specifically limited, and may be manufactured by making a sheet or film through a common process, for example, a T die process or extrusion. For example, the manufacture of the optical film may be performed by an in situ process using an apparatus in which the preparation of a modified resin composition using the resin composition, and a process for making a film or a sheet are connected with each other.

The thickness of the optical film may be controlled to about 10 μm to 2,000 μm, or about 100 μm to 1,250 μm, and considering the supporting efficiency and breaking possibility of a device in an optoelectronic device, the weight lightening or workability of the device, etc., the thickness may be changed according to particular use.

EXAMPLES

Hereinafter, preferred embodiments will be suggested to assist the understanding of the present invention. However, the embodiments are provided only for easy understanding of the present invention, and the contents of the present invention is not limited thereto.

Synthetic Example 1: Preparation of Transition Metal Compound

Step 1: Preparation of Ligand Compound (1a-1)

To a 250 mL schlenk flask, 10 g of 1,2-dimethyl-3H-benzo[b]cyclopenta[d]thiophene (1.0 eq, 49.925 mmol) and 100 mL of THF were put, and 22 mL of n-BuLi (1.1 eq, 54.918 mmol, 2.5 M in hexane) was added thereto dropwise at −30° C., followed by stirring at room temperature for 3 hours. A stirred Li-complex THF solution was cannulated into a schlenk flask containing 8.1 mL of dichloro(methyl)(phenyl)silane (1.0 eq, 49.925 mmol) and 70 mL of THF at −78° C., followed by stirring at room temperature overnight. After stirring, drying in vacuum was carried out and extraction with 100 ml of hexane was carried out.

To 100 ml of an extracted chloro-1-(1,2-dimethyl-3H-benzo[b]cyclopenta[d]thiophene-3-yl)-1,1-(methyl) (phenyl)silane hexane solution, 42 mL of $t\text{-}BuNH_2$ (8 eq, 399.4 mmol) was injected at room temperature, followed by stirring at room temperature overnight. After stirring, drying in vacuum was carried out and extraction with 150 ml of hexane was carried out. After drying the solvents, 13.36 g of a yellow solid (68%, dr=1:1) was obtained.

(1a-1)

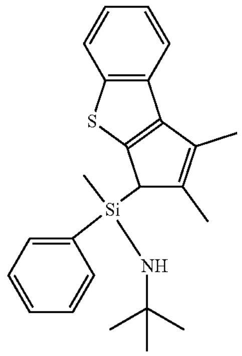

$^1$H NMR ($CDCl_3$, 500 MHz): δ 7.93 (t, 2H), 7.79 (d, 1H), 7.71 (d, 1H), 7.60 (d, 2H), 7.48 (d, 2H), 7.40-7.10 (m, 10H, aromatic), 3.62 (s, 1H), 3.60 (s, 1H), 2.28 (s, 6H), 2.09 (s, 3H), 1.76 (s, 3H), 1.12 (s, 18H), 0.23 (s, 3H), 0.13 (s, 3H)

Step 2: Preparation of Transition Metal Compound (1a)

To a 100 mL schlenk flask, 4.93 g of a ligand compound 1a-1 (12.575 mmol, 1.0 eq) and 50 mL of toluene (0.2 M) were put and 10.3 mL of n-BuLi (25.779 mmol, 2.05 eq, 2.5M in hexane) was added thereto dropwise at −30° C., followed by stirring at room temperature overnight. After stirring, 12.6 mL of MeMgBr (37.725 mmol, 3.0 eq, 3.0 M in diethyl ether) was added thereto dropwise, 13.2 mL of $TiCl_4$ (13.204 mmol, 1.05 eq, 1.0 M in toluene) was put in order, followed by stirring at room temperature overnight. After stirring, drying in vacuum and extraction with 150 mL of hexane were carried out, the solvent was removed to 50 mL, and 4 mL of DME (37.725 mmol, 3.0 eq) was added dropwise, followed by stirring at room temperature overnight. Again, drying in vacuum and extraction with 150 mL of hexane were carried out. After dying the solvents, 2.23 g of a brown solid (38%, dr=1:0.5) was obtained.

(1a)

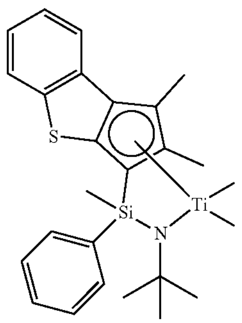

1H NMR ($CDCl_3$, 500 MHz): δ 7.98 (d, 1H), 7.94 (d, 1H), 7.71 (t, 6H), 7.50-7.30 (10H), 2.66 (s, 3H), 2.61 (s, 3H), 2.15 (s, 3H), 1.62 (s, 9H), 1.56 (s, 9H), 1.53 (s, 3H), 0.93 (s, 3H), 0.31 (s, 3H), 0.58 (s, 3H), 0.51 (s, 3H), −0.26 (s, 3H), −0.39 (s, 3H)

Synthetic Example 2: Preparation of Transition Metal Compound

Step 1: Preparation of Ligand Compound (2a-1)

(i) Preparation of Lithium Carbamate 1,2,3,4-tetrahydroquinoline (13.08 g, 98.24 mmol) and diethyl ether (150 mL) were put in a schlenk flask. To a low temperature bath of −78° C. obtained using dry ice and acetone, the schlenk flask was immersed and stirred for 30 minutes. Then, n-BuLi (39.3 mL, 2.5 M, 98.24 mmol) was injected thereto using a syringe in a nitrogen atmosphere, and a pale-yellow slurry was formed. Then, the flask was stirred for 2 hours, and the temperature of the flask was elevated to room temperature while removing the butane gas thus produced. The flask was immersed into the low temperature bath of −78° C. again to decrease its temperature and a $CO_2$ gas was injected. During the injection of the carbon dioxide gas, the slurry disappeared and a transparent solution was obtained. The flask was connected with a bubbler, and the temperature was elevated to room temperature while removing carbon dioxide gas. Then, the remaining $CO_2$ gas and solvents were removed in vacuum. After transporting the flask into a dry box, pentane was added, and vigorous stirring and filtering were carried out to obtain lithium carbamate which was a white solid compound. The white solid compound made a coordination bond with diethyl ether. In this case, yield was 100%.

$^1$H NMR ($C_6D_6$, $C_5D_5N$): δ 1.90 (t, J=7.2 Hz, 6H, ether), 1.50 (br s, 2H, quin-$CH_2$), 2.34 (br s, 2H, quin-$CH_2$), 3.25 (q, J=7.2 Hz, 4H, ether), 3.87 (br, s, 2H, quin-$CH_2$), 6.76 (br d, J=5.6 Hz, 1H, quin-CH) ppm

$^{13}$C NMR ($C_6D_6$): δ 24.24, 28.54, 45.37, 65.95, 121.17, 125.34, 125.57, 142.04, 163.09 (C═O) ppm (ii) Preparation of 8-(2,3,4,5-tetramethyl-1,3-cyclopentadienyl)-1,2,3,4-tetrahydroquinoline (2a-1)

The lithium carbamate compound (8.47 g, 42.60 mmol) prepared in step (i) was put in a schlenk flask. Then, tetrahydrofuran (4.6 g, 63.9 mmol) and 45 mL of diethyl ether were added thereto in order. To a low temperature bath of −20° C. obtained using acetone and a small amount of dry ice, the schlenk flask was immersed and stirred, and then, t-BuLi (25.1 mL, 1.7 M, 42.60 mmol) was added. At this point, the color of the reaction mixture was changed to red. Stirring was carried out for 6 hours while keeping at −20° C. A $CeCl_3 \cdot 2LiCl$ solution dissolved in tetrahydrofuran (129 mL, 0.33 M, 42.60 mmol) and tetramethylcyclopentanone (5.89 g, 42.60 mmol) were mixed in a syringe, and then, the mixture was injected into the flask in a nitrogen atmosphere. While slowly elevating the temperature of the flask to room temperature, a constant-temperature bath was removed after one hour, and the temperature was maintained to room temperature. Then, water (15 mL) was added to the flask, ethyl acetate was added thereto, and filtering was performed to obtain a filtrate. The filtrate was transported to a separating funnel and hydrochloric acid (2 N, 80 mL) was added thereto, followed by shaking for 12 minutes. Then, a saturated sodium bicarbonate aqueous solution (160 mL) was added thereto to neutralize, and an organic layer was extracted. To the organic layer, anhydrous magnesium sulfate was added to remove moisture and filtering was carried out. The filtrate was taken and solvents were removed. The filtrate thus obtained was separated by a column chromatography method using a solvent of hexane and ethyl acetate (v/v, 10:1) to obtain a yellow oil. Yield was 40%.

(2a-1)

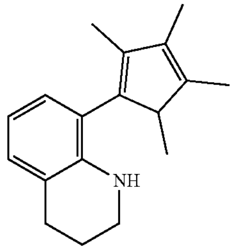

$^1H$ NMR ($C_6D_6$): δ 1.00 (br d, 3H, Cp-$CH_3$), 1.63-1.73 (m, 2H, quin-$CH_2$), 1.80 (s, 3H, Cp-$CH_3$), 1.81 (s, 3H, Cp-$CH_3$), 1.85 (s, 3H, Cp-$CH_3$), 2.64 (t, J=6.0 Hz, 2H, quin-$CH_2$), 2.84-2.90 (br, 2H, quin-$CH_2$), 3.06 (br s, 1H, Cp-H), 3.76 (br s, 1H, N—H), 6.77 (t, J=7.2 Hz, 1H, quin-CH), 6.92 (d, J=2.4 Hz, 1H, quin-CH), 6.94 (d, J=2.4 Hz, 1H, quin-CH) ppm Step 2: Preparation of Transition Metal Compound (2a)

(i) Preparation of [(1,2,3,4-tetrahydroquinolin-8-yl) tetramethylcyclopentadienyl-η5,κ-N]dilithium compound In a dry box, 8-(2,3,4,5-tetramethyl-1,3-cyclopentadienyl)-1,2,3,4-tetrahydroquinoline (8.07 g, 32.0 mmol) prepared through step (1) and 140 mL of diethyl ether were put in a round flask, the temperature was decreased to −30° C., and n-BuLi (17.7 g, 2.5 M, 64.0 mmol) was slowly added thereto while stirring. The reaction was carried out for 6 hours while elevating the temperature to room temperature.

Then, the resultant product was filtered while washing with diethyl ether many times to obtain a solid. The remaining solvents were removed in vacuum to obtain a dilithium compound as a yellow solid (9.83 g). Yield was 95%.

1H NMR ($C_6D_6$, $C_5D_5N$): δ 2.38 (br s, 2H, quin-$CH_2$), 2.53 (br s, 12H, Cp-$CH_3$), 3.48 (br s, 2H, quin-$CH_2$), 4.19 (br s, 2H, quin-$CH_2$), 6.77 (t, J=6.8 Hz, 2H, quin-CH), 7.28 (br s, 1H, quin-CH), 7.75 (brs, 1H, quin-CH) ppm (ii) Preparation of [(1,2,3,4-tetrahydroquinolin-8-yl) tetramethylcyclopentadienyl-η5,κ-N]titanium dimethyl (2a)

In a dry box, $TiCl_4 \cdot DME$ (4.41 g, 15.76 mmol) and diethyl ether (150 mL) were put in a round flask and while stirring at −30° C., MeLi (21.7 mL, 31.52 mmol, 1.4 M) was slowly added. After stirring for 15 minutes, the (1,2,3,4-tetrahydroquinolin-8-yl)tetramethylcyclopentadienyl-η5,κ-N]dilithium compound (5.30 g, 15.76 mmol) prepared in step (i) was added to the flask. Stirring was performed for 3 hours while elevating the temperature to room temperature. After finishing the reaction, the solvents were removed in vacuum, and the resultant product was dissolved in pentane and filtered, and the filtrate was obtained. Pentane was removed in vacuum to obtain a dark brown compound (3.70 g). Yield was 71.3%.

(2a)

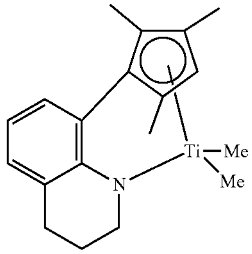

$^1H$ NMR ($C_6D_6$) δ 0.59 (s, 6H, Ti—$CH_3$), 1.66 (s, 6H, Cp-$CH_3$), 1.69 (br t, J=6.4 Hz, 2H, quin-$CH_2$), 2.05 (s, 6H, Cp-$CH_3$), 2.47 (t, J=6.0 Hz, 2H, quin-$CH_2$), 4.53 (m, 2H, quin-$CH_2$), 6.84 (t, J=7.2 Hz, 1H, quin-CH), 6.93 (d, J=7.6 Hz, quin-CH), 7.01 (d, J=6.8 Hz, quin-CH) ppm $^{13}C$ NMR ($C_6D_6$): δ 12.12, 23.08, 27.30, 48.84, 51.01, 119.70, 119.96, 120.95, 126.99, 128.73, 131.67, 136.21 ppm.

Preparation of ethylene/alpha-olefin copolymer

Example 1

Into a 1.5 L autoclave continuous process reactor, a hexane solvent (5.5 kg/h) and 1-butene (0.8 kg/h) were charged, and the top of the reactor was pre-heated to a temperature of 155° C. A triisobutylaluminum compound (0.05 mmol/min), the transition metal compound (1a) (0.15 μmol/min) prepared in Synthetic Example 1 as a catalyst, a dimethylanilium tetrakis(pentafluorophenyl) borate promoter (0.15 μmol/min) were injected into the reactor at the same time. Then, into the autoclave reactor, ethylene (0.87 kg/h) and a hydrogen gas (25 cc/min) were injected and a copolymerization reaction was continuously carried out while maintaining a pressure of 89 bar and a polymerization temperature of 140° C. for 60 minutes or more to prepare a copolymer.

Then, a remaining ethylene gas was exhausted out and the copolymer-containing solution thus obtained was dried in a vacuum oven for 12 hours or more. The physical properties of the copolymer thus obtained in a bale type were measured.

Examples 2 to 14 and Comparative Examples 1 to 7

Polymers of Examples 2 to 14 were prepared by carrying out the same method as in Example 1 except that the reactant materials were injected in amounts listed in Table 1 below.

In addition, polymers of Comparative Examples 4 to 7 were prepared by using the transition metal compound (2a) prepared in Synthetic Example 2 and carrying out the same method as in Example 1 except that the reactant materials were injected in amounts listed in Table 1 below.

Meanwhile, a LC885X product of LG Chem, was purchased and used as Comparative Example 1, a DF8200 product of Mitsui Co. was purchased and used as Comparative Example 2, and a DF610 product of Mitsui Co. was purchased and used as Comparative Example 3.

TABLE 1

| | C2 | C6 | 1-C4 | $H_2$ | Cat. | Co-cat. | poly-merization temperature |
|---|---|---|---|---|---|---|---|
| | Kg/h | | | sccm | μmol/min | | ° C. |
| Example 1 | 0.87 | 5.5 | 0.8 | 25 | 0.15 | 0.15 | 140 |
| Example 2 | 0.87 | 5.5 | 0.8 | 26 | 0.25 | 0.375 | 144 |
| Example 3 | 0.87 | 5.5 | 0.9 | 15 | 0.3 | 0.45 | 160 |
| Example 4 | 0.87 | 5.5 | 0.8 | 20 | 0.075 | 1 | 140 |
| Example 5 | 0.87 | 5.5 | 0.8 | 20 | 0.25 | 0.04 | 140 |
| Example 6 | 0.87 | 5.5 | 0.7 | 22 | 0.075 | 0.5 | 140 |
| Example 7 | 0.87 | 5.5 | 0.7 | 22 | 0.25 | 0.04 | 140 |
| Example 8 | 0.87 | 5.5 | 0.85 | 24 | 0.25 | 0.375 | 155 |
| Example 9 | 0.87 | 5.5 | 0.8 | 10 | 0.25 | 0.375 | 148 |

TABLE 1-continued

| | C2 | C6 | 1-C4 | $H_2$ | Cat. | Co-cat. | poly-merization temperature |
|---|---|---|---|---|---|---|---|
| | Kg/h | | | sccm | μmol/min | | ° C. |
| Example 10 | 0.87 | 5.5 | 0.8 | 10 | 0.25 | 0.375 | 146 |
| Example 11 | 0.87 | 5.5 | 0.85 | 24 | 0.25 | 0.375 | 152 |
| Example 12 | 0.87 | 5.5 | 0.85 | 24 | 0.25 | 0.375 | 161 |
| Example 13 | 0.87 | 5.5 | 0.85 | 24 | 0.25 | 0.375 | 172 |
| Example 14 | 0.87 | 7.0 | 0.83 | 16 | 0.17 | 0.34 | 140 |
| Comparative Example 4 | 0.87 | 5.5 | 0.45 | 6 | 0.30 | 0.90 | 160 |
| Comparative Example 5 | 0.87 | 5.5 | 0.43 | 6 | 0.24 | 0.72 | 160 |
| Comparative Example 6 | 0.87 | 5.0 | 0.62 | 0 | 0.32 | 0.96 | 145 |
| Comparative Example 7 | 0.87 | 5.5 | 0.7 | 0 | 0.33 | 0.74 | 165 |

In addition, the number of each functional group of vinylene, trivinyl, vinyl and vinylidene per 1000 carbon atoms in the copolymers of Examples 1 to 14 and Comparative Examples 1 to 7 were measured through nuclear magnetic spectroscopy analysis according to the methods below and the results are shown in Table 2.

① Measurement was carried out after dissolving the copolymer in a 1,1,2,2-tetrachloroethane $D_2$ (TCE-d2) solvent, using a Bruker AVANCE III 500 MHz NMR equipment at 393K.

②The amount ratio of a comonomer was calculated by calibrating a TCE-d2 peak in 1H NMR spectrum and using integration values in 1.4 ppm and 0.96 ppm regions. Each of the amounts of the vinyl group, the vinylidene group, the vinylene group and the trivinyl group observed at 4.7 ppm-5.6 ppm was calculated (analysis method: AMT-3863). Peak assignment referred to a document [*Macromolecules* 2014, 47, 3282-3790].

TABLE 2

| | Relative amount (no./1000 C) | | | | | Vinyl/ | Vinyl-idene/ | Tri-vinyl/ Total |
|---|---|---|---|---|---|---|---|---|
| | Vinylene | Trivinyl | Vinyl | Vinylidene | Total | Total | Total | (%) |
| Example 1 | 0.1 | 0.04 | 0.05 | 0.02 | 0.2 | 0.25 | 0.1 | 0.20 |
| Example 2 | 0.16 | 0.02 | 0.06 | 0.02 | 0.26 | 0.23 | 0.08 | 0.08 |
| Example 3 | 0.19 | 0.04 | 0.1 | 0.03 | 0.36 | 0.28 | 0.08 | 0.11 |
| Example 4 | 0.1 | 0.02 | 0.07 | 0.06 | 0.25 | 0.28 | 0.24 | 0.08 |
| Example 5 | 0.08 | 0.02 | 0.05 | 0.04 | 0.2 | 0.25 | 0.2 | 0.10 |
| Example 6 | 0.07 | 0.03 | 0.05 | 0.04 | 0.19 | 0.26 | 0.21 | 0.16 |
| Example 7 | 0.06 | 0.02 | 0.05 | 0.04 | 0.17 | 0.29 | 0.24 | 0.12 |
| Example 8 | 0.12 | 0.07 | 0.07 | 0.01 | 0.27 | 0.26 | 0.04 | 0.26 |
| Example 9 | 0.11 | 0.07 | 0.07 | 0.01 | 0.25 | 0.28 | 0.04 | 0.28 |
| Example 10 | 0.11 | 0.06 | 0.08 | 0.01 | 0.25 | 0.32 | 0.04 | 0.24 |
| Example 11 | 0.15 | 0.13 | 0.14 | 0.01 | 0.43 | 0.33 | 0.02 | 0.30 |
| Example 12 | 0.13 | 0.08 | 0.09 | 0.02 | 0.31 | 0.29 | 0.06 | 0.26 |
| Example 13 | 0.1 | 0.05 | 0.05 | 0.02 | 0.22 | 0.23 | 0.09 | 0.23 |
| Example 14 | 0.09 | 0.03 | 0.03 | 0 | 0.15 | 0.20 | 0.00 | 0.20 |
| Comparative Example 1 | 0.46 | 0.05 | 0.1 | 0.08 | 0.69 | 0.14 | 0.12 | 0.07 |
| Comparative Example 2 | 0.01 | 0 | 0.03 | 0.01 | 0.05 | 0.60 | 0.20 | 0 |
| Comparative Example 3 | 0.06 | 0.02 | 0.02 | 0.03 | 0.12 | 0.17 | 0.25 | 0.17 |
| Comparative Example 4 | 0.10 | 0.02 | 0.03 | 0.05 | 0.21 | 0.14 | 0.24 | 0.10 |
| Comparative Example 5 | 0.08 | 0.02 | 0.03 | 0.04 | 0.18 | 0.17 | 0.22 | 0.11 |
| Comparative Example 6 | 0.4 | 0.09 | 0.09 | 0.07 | 0.65 | 0.14 | 0.11 | 0.14 |
| Comparative Example 7 | 0.06 | 0.02 | 0.15 | 0.04 | 0.27 | 0.56 | 0.15 | 0.07 |

In addition, the melt index, density, weight average molecular weight (Mw) and molecular weight distribution (MWD) of Examples 1 to 14 and Comparative Examples 1 to 6 were measured and are listed in Table 3 below.

① Density (g/cm$^3$): measured according to ASTM D-792.

② Melt Index (MI) measured according to ASTM D-1238 (Condition E, 190° C., 2.16 Kg load).

③ Melt Index ($MI_{10}$): measured according to ASTM D-1238 (Condition E, 190° C., 10 Kg load).

④ Weight average molecular weight (Mw) and number average molecular weight (Mn) of the copolymer thus produced were measured under the following conditions of gel permeation chromatography (GPC) analysis:

column: Agilent Olexis solvent: trichlorobenzene (TCB)

flow rate: 1.0 ml/min specimen concentration: 1.0 mg/ml injection amount: 200 μl column temperature: 160° C.

Detector: Agilent High Temperature RI detector

Standard: Polystyrene (calibrated by cubic function)

Data processing: Cirrus

⑤ Molecular weight distribution was calculated from a ratio of Mw/Mn.

TABLE 3

| | density g/cm$^3$ | $MI_{2.16}$ dg/min | $MI_{10}$ dg/min | $MI_{10}/MI_{2.16}$ — | Mw Da | MWD — |
|---|---|---|---|---|---|---|
| Example 1 | 0.876 | 18 | 102.5 | 5.69 | 55,000 | 1.94 |
| Example 2 | 0.879 | 20 | 113.8 | 5.69 | 55,000 | 2.1 |
| Example 3 | 0.877 | 14 | 103.2 | 7.37 | 55,000 | 1.9 |
| Example 4 | 0.870 | 14.5 | 93.3 | 6.43 | — | — |
| Example 5 | 0.871 | 13.5 | 84.1 | 6.23 | — | — |
| Example 6 | 0.876 | 12.8 | 82.4 | 6.44 | 54,000 | 1.9 |
| Example 7 | 0.876 | 14 | 85.2 | 6.08 | 52,000 | 1.9 |
| Example 8 | 0.879 | 18.4 | 119.7 | 6.50 | 55,000 | 2.14 |
| Example 9 | 0.879 | 2.24 | 16.3 | 7.29 | 89,000 | 2.04 |
| Example 10 | 0.879 | 0.95 | 7.3 | 7.67 | 112,000 | 2.1 |
| Example 11 | 0.874 | 33.7 | 217.8 | 6.46 | 47,000 | 2.06 |
| Example 12 | 0.883 | 25.3 | 160.8 | 6.36 | 50,000 | 2.01 |
| Example 13 | 0.893 | 11.9 | 83.3 | 7.00 | 58,000 | 2.12 |
| Example 14 | 0.880 | 16.3 | 103.0 | 6.32 | 50,000 | 2.14 |
| Comparative Example 1 | 0.881 | 22 | 151.8 | 6.9 | 54,000 | 2.4 |
| Comparative Example 2 | 0.884 | 17 | 108.2 | 6.36 | 55,000 | 1.9 |
| Comparative Example 3 | 0.863 | 1.32 | 8.6 | 6.52 | 107,000 | 1.98 |
| Comparative Example 4 | 0.897 | 5.86 | 41.7 | 7.12 | 68,000 | 1.92 |
| Comparative Example 5 | 0.900 | 2.80 | 20.4 | 7.30 | 77,000 | 2.02 |
| Comparative Example 6 | 0.862 | 1.20 | 9.3 | 7.72 | 91,000 | 2.18 |

From the results of Table 3, it could be confirmed that the ethylene/alpha-olefin copolymers of Examples 1 to 14 of the present invention had narrower molecular weight distribution when compared with Comparative Examples 1, 6.

In addition, the molecular weight distributions of Example 2 and Comparative Example 1 are shown in FIG. 1. From the results, it could be confirmed that Example 2 had narrower molecular weight distribution when compared with Comparative Example 1.

Experimental Example 1—Crosslinking Behavior Properties and Crosslinking Degree

[Manufacture of Film]

(1) To 500 g of a sample of Example 1, a crosslinking coagent composition was injected according to the recipe (a) below and then, the resultant composition was soaked at 40° C. for 1 hour and aged for 15 hours.

In addition, resin compositions were prepared by the same method as described above except for applying a different recipe among (a) to (f) to each sample of Examples 2, 8 and 14, and Comparative Examples 1, 2, 4 and 5 as shown in Table 4 below.

(a) t-butyl 1-(2-ethylhexyl) monoperoxycarbonate (TBEC) 1 phr (parts per hundred rubber), triallylisocyanurate (TAIC) 0.5 phr, methacryloxypropyltrimethoxysilane (MEMO) 0.2 phr (b) TBEC 0.6 phr, TAIC 0.8 phr, MEMO 0.2 phr/toluene (c) TBEC 0.6 phr, TAIC 0.93 phr, MEMO 0.21 phr/toluene (d) The same recipe (c) was applied except for applying 1.5 hours of soaking time instead of 1 hour.

(e) TBEC 0.6 phr, TAIC 0.93 phr, MEMO 0.21 phr/xylene (f) TBEC 0.6 phr, TAIC 0.8 phr, MEMO 0.3 phr/xylene (2) A film with an average thickness of 450 μm was manufactured using the sample thus soaked and a micro extruder, at a low temperature not enough for crosslinking at a high temperature (conditions of extruder barrel temperature of 90° C. or less).

In order to apprehend crosslinking behavior properties, the film containing the crosslinking coagent composition was manufactured with 5 g into a disc shape having a diameter of 4 cm in (2), and resultant values are shown in Table 4 together with the maximum torque MH values until being scorched at 150° C. for 1 hour, etc.

Such crosslinking behavior properties were measured using a Moving Die Rheometer called Premier MDR of Alpha Technologies Co.

[Manufacture of Crosslinked Sheet]

The top and bottom of the film sample manufactured in the process (2) of [manufacture of film] were covered with Teflon sheets and then, the sample was put in a vacuum laminator and laminated at 150° C. for 15 minutes to manufacture a crosslinked sheet. The crosslinked sheet is for the measurement of a crosslinking degree and optical properties after crosslinking, and is not an attached type to any substrate such as a glass substrate.

The crosslinked sheet was put in toluene (solvent for extracting non-crosslinked polymer) by 0.5 g and aged at 60° C. for 15 hours. After washing toluene, drying was performed at 80° C. for 6 hours. After drying, the weight of the sample was measured and the crosslinking degree was measured according to the equation below and is shown in Table 4.

$$*\text{crosslinking degree} = (\text{weight after drying/weight prior to being treated with toluene}) * 100$$

TABLE 4

| | cross-linking degree % | ML | MH dNm | Final torque | T10 | T50 | T90 min | T95 | Max rate dNm/min |
|---|---|---|---|---|---|---|---|---|---|
| (a) Example 1 | 67 | 0.02 | 2.77 | 2.75 | 1.64 | 4.49 | 13.26 | 18.48 | 0.45 |
| (a) Comparative Example 1 | 57 | 0.04 | 2.54 | 2.53 | 2.14 | 5.87 | 16.17 | 20.26 | 0.30 |
| (b) Example 2 | 58 | 0.01 | 2.54 | 2.51 | 2.94 | 6.26 | 15.63 | 20.07 | 0.34 |
| (b) Comparative Example 1 | 44 | 0.03 | 1.88 | 1.87 | 2.08 | 6.11 | 17.03 | 23.32 | 0.20 |
| (c) Example 8 | 56 | 0.02 | 2.79 | 2.78 | 3.03 | 6.78 | 17.00 | 22.90 | 0.33 |
| (d) Example 8 | 60.2 | 0.02 | 2.97 | 2.96 | 2.95 | 6.52 | 16.58 | 20.58 | 0.37 |
| (c) Comparative Example 2 | 49 | 0.01 | 2.80 | 2.79 | 3.09 | 6.07 | 15.07 | 18.95 | 0.41 |
| (e) Example 14 | 55 | 0.02 | 2.41 | 2.40 | 3.26 | 7.12 | 17.17 | 22.66 | 0.27 |
| (e) Comparative Example 2 | 51 | 0.02 | 2.10 | 2.09 | 3.19 | 6.59 | 15.93 | 19.53 | 0.27 |
| (f) Example 14 | 56 | 0.01 | 2.51 | 2.49 | 3.08 | 6.62 | 16.82 | 21.45 | 0.30 |
| (f) Comparative Example 4 | 41 | 0.02 | 1.62 | 1.60 | 3.87 | 7.42 | 18.44 | 26.12 | 0.18 |
| (f) Comparative Example 5 | 39 | 0.01 | 1.59 | 1.56 | 3.94 | 7.57 | 18.62 | 26.35 | 0.17 |

(a) TBEC 1 phr, TAIC 0.5 phr, MEMO 0.2 phr/toluene (solvent for extracting non-crosslinking polymer)

(b) TBEC 0.6 phr, TAIC 0.8 phr, MEMO 0.2 phr/toluene (solvent for extracting non-crosslinking polymer)

(c) TBEC 0.6 phr, TAIC 0.93 phr, MEMO 0.21 phr/toluene (solvent for extracting non-crosslinking polymer)

(d) The same recipe (c) was applied except for applying 1.5 hours of soaking time instead of 1 hour.

(e) TBEC 0.6 phr, TAIC 0.93 phr, MEMO 0.21 phr/xylene (solvent for extracting non-crosslinking polymer)

(f) TBEC 0.6 phr, TAIC 0.8 phr, MEMO 0.3 phr/xylene (solvent for extracting non-crosslinking polymer)

In the results of the crosslinking behavior properties in Table 4, the higher the MH value and the final torque value are, the higher the crosslinking degree is. In addition, the T value is a factor relating to a crosslinking rate, and for example T90 represents time required until a torque value reaches 90% saturation, and the smaller this value is, the faster the crosslinking rate is.

Figure 2:
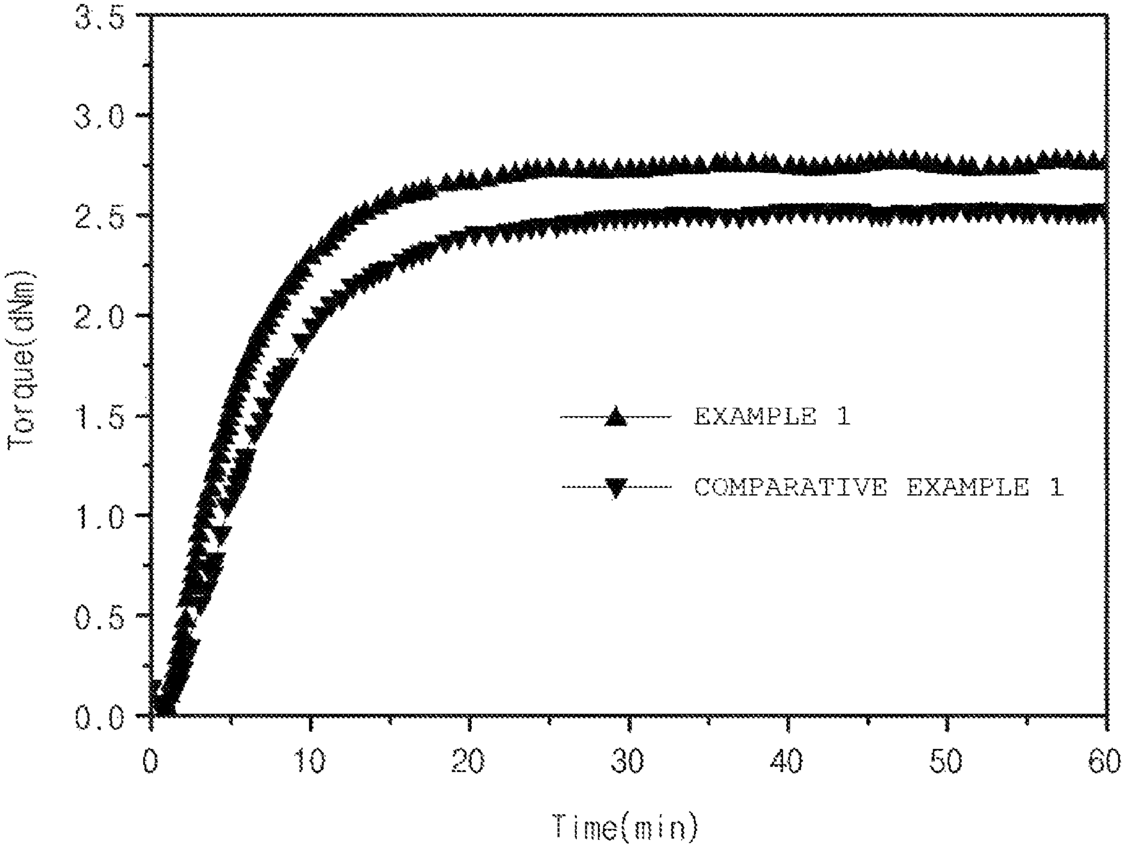
FIG. 2 shows crosslinking behavior properties according to a crosslinking recipe (a) on Example 1 as an embodiment of the present invention and Comparative Example 1.
Figure 3:
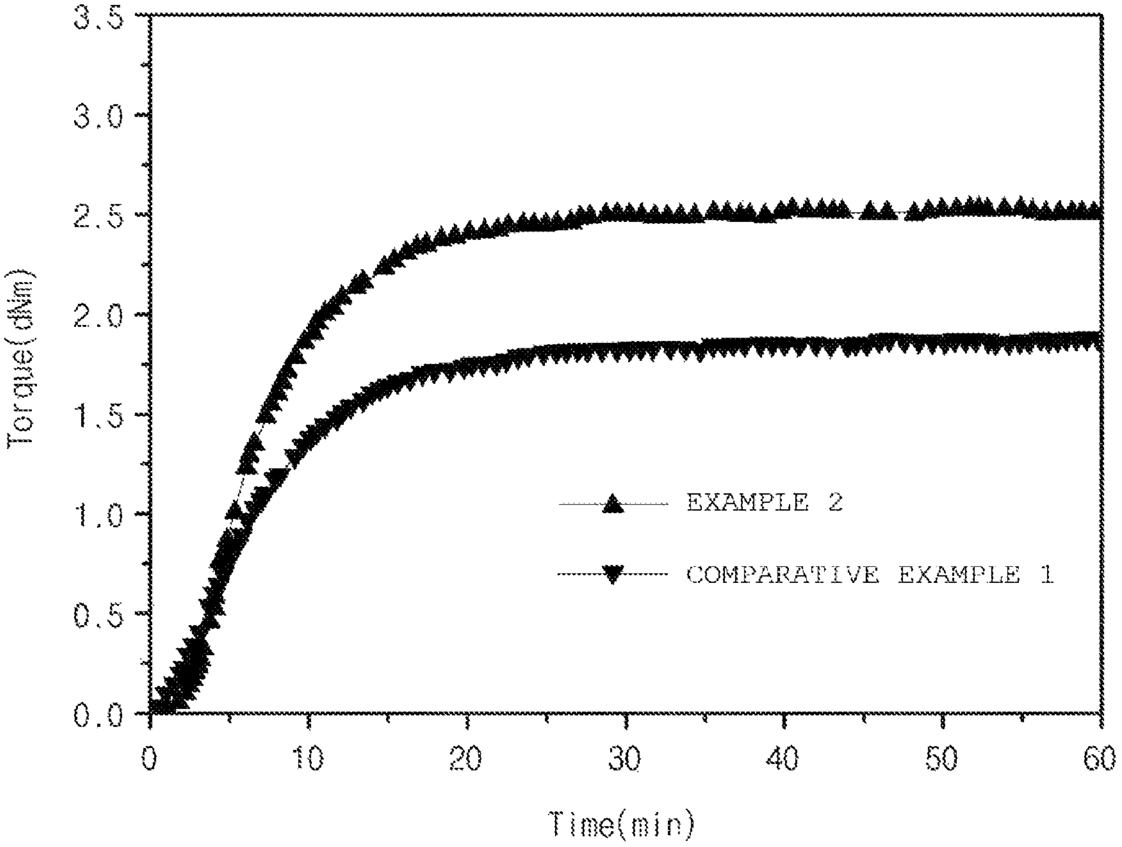
FIG. 3 shows crosslinking behavior properties according to a crosslinking recipe (b) on Example 2 as an embodiment of the present invention and Comparative Example 1.

FIG. 2 shows (a) the crosslinking behavior properties of Example 1 and Comparative Example 1 according to crosslinking recipe (a), and FIG. 3 shows the crosslinking behavior properties of Example 2 and Comparative Example 1 according to crosslinking recipe (b).

In addition, from the results of Table 4, when comparing the Example and the Comparative Example, to which the same crosslinking recipe was applied, it could be confirmed that the resin composition using the polymer of the Example showed higher crosslinking degree when compared with that of the Comparative Example. Particularly, the crosslinking degrees of the resin compositions of Examples 1 and 2 were higher by 10% or more when compared with Comparative Example 1, to which the same crosslinking recipe was applied. In addition, Example 14 showed remarkably higher crosslinking degree when compared with Comparative Examples 4 and 5, to which the same crosslinking recipe (f) was applied.

In addition, it could be confirmed that the crosslinking degree was even further improved if the soaking time is increased (that is, recipe (d)) for Example 8.

Experimental Example 2—Optical Properties

With respect to the crosslinked sheets, yellow index (YI) and total light transmittance (Tt) were measured according to the methods below, and the results are listed in Table 5 below.

In addition, the yellow index (YI) and the total light transmittance (Tt) after the process of [manufacture of film] and prior to the manufacture of the crosslinked sheet, were listed as data of "prior to crosslinking" in Table 5 below.

① Yellow index (YI): reflectance in a region of 400 nm to 700 nm was measured based on ASTM 1925 using Colorflex (Hunter lab), and a YI value was obtained using the same and according to the following Equation 4:

$$YI = [100(1.28XCIE - 1.06ZCIE)]/YCIE \quad \text{[Formula 4]}$$

The YI is a value calculated using a color difference analysis program in UV/VIS/NIR spectrometer (ASTM, D1925), and XCIE, YCIE, and ZCIE are relative values representing red, green and blue color coordinates, respectively.

② Total light transmittance (Tt): Total light transmittance on light with a wavelength of 550 nm was measured using a haze meter. The transmittance was measured after putting a specimen in a specimen holder three times under standard conditions of JIS K 7105, and an average value was obtained.

TABLE 5

| | After crosslinking | | Prior to crosslinking | |
|---|---|---|---|---|
| | Tt@550 nm | YI | Tt@550 nm | YI |
| (a) Example 1 | 91 | 0.82 | 89.4 | 3.5 |
| (b) Example 2 | 90.9 | 1.34 | 88.7 | 3.9 |
| (c) Example 8 | 90.9 | 0.86 | 88.2 | 3.4 |
| (e) Example 14 | 91.2 | 0.83 | 89.1 | 3.7 |
| (f) Example 14 | 91.5 | 0.9 | 90.0 | 3.4 |
| (a) Comparative Example 1 | 89.4 | 1.63 | 86 | 6.1 |
| (c) Comparative Example 2 | 89.3 | 1.74 | 85.3 | 5.9 |

TABLE 5-continued

| | After crosslinking | | Prior to crosslinking | |
|---|---|---|---|---|
| | Tt@550 nm | YI | Tt@550 nm | YI |
| (f) Comparative Example 4 | 89.1 | 3.1 | 88.5 | 7.4 |
| Comparative Example 5 | 88.8 | 3.7 | 88.1 | 8.1 |

In Table 5, it could be confirmed that a film formed by including the ethylene/alpha-olefin copolymer of the present invention showed excellent total light transmittance and yellow index when compared with the Comparative Examples.

Particularly, the Examples of the present invention showed a yellow index numerical in a range of 0.82 to 1.34 and was very excellent when compared with that of 1.63 to 3.7 of the Comparative Examples. In addition, it could be confirmed that the Examples of the present invention showed the total light transmittance after crosslinking of 90.9 or more, and was remarkably improved when compared with the Comparative Examples, which showed maximum 89.4. Accordingly, the ethylene/alpha-olefin copolymer of the present invention is expected to be applied for the manufacture of an optical film having excellent optical properties.

The invention claimed is:

1. An ethylene/1-butene copolymer satisfying the following conditions (a) to (d):

(a) density measured according to ASTM D-792: 0.850 to 0.910 g/cc, (b) melt index (MI, 190° C., 2.16 kg load conditions): 0.1 to 100 dg/min, (c) molecular weight distribution (MWD): 1.5 to 3.0, and (d) a $R_v$ value according to Equation 1 below of 0.18 to 0.46:

$$R_v = \frac{N_v}{N_{vd} + N_{tv} + N_{vl} + N_v} \quad \text{[Equation 1]}$$

in Equation 1, $N_{vd}$, $N_{tv}$, $N_{vl}$ and $N_v$ are the number of vinylidene, trivinyl, vinylene and vinyl functional groups per 1000 carbon atoms, respectively, measured by nuclear magnetic spectroscopy using Bruker AVANCE III 500 MHz NMR equipment at 393 K, after dissolving the copolymer in a 1,1,2,2-tetrachloroethane D2 (TCE-d2) solvent, wherein the number of vinyl functional groups per 1000 carbon atoms, measured by nuclear magnetic spectroscopy analysis, is 0.01 to 0.3.

2. The ethylene/1-butene copolymer according to claim 1, wherein (e) a $R_{vd}$ value according to Equation 2 below is 0.25 or less:

$$R_{vd} = \frac{N_{vd}}{N_{vd} + N_{tv} + N_{vl} + N_v} \quad \text{[Equation 2]}$$

in Equation 2, $N_{vd}$, $N_{tv}$, $N_{vl}$ and $N_v$ are the number of vinylidene, trivinyl, vinylene and vinyl functional groups per 1000 carbon atoms, respectively, measured by nuclear magnetic spectroscopy analysis.

3. The ethylene/1-butene copolymer according to claim 1, wherein the $R_v$ value is 0.19 to 0.46.

4. The ethylene/1-butene copolymer according to claim 2, wherein the $R_{vd}$ value is 0.02 to 0.10.

5. The ethylene/1-butene copolymer according to claim 1, wherein (f) a $R_{tv}$ value according to Equation 3 below is 0.12 or more:

$$R_{tv} = \frac{N_{tv}}{N_{vd} + N_{tv} + N_{vl} + N_v} \quad \text{[Equation 3]}$$

in Equation 3, $N_v$, $N_{tv}$, $N_{vl}$ and $N_{vd}$ are the number of vinyl, trivinyl, vinylene and vinylidene functional groups per 1000 carbon atoms, respectively, measured by nuclear magnetic spectroscopy analysis.

6. The ethylene/1-butene copolymer according to claim 5, wherein the $R_{tv}$ value is 0.12 to 0.30.

7. The ethylene/1-butene copolymer according to claim 1, wherein the density is 0.855 to 0.90 g/cc.

8. The ethylene/1-butene copolymer according to claim 1, wherein the melt index (190° C., 2.16 kg load conditions) is 1.5 to 37 dg/min.

9. The ethylene/1-butene copolymer according to claim 1, wherein a $MI_{10}/MI_{2.16}$ value, which is a melt index (190° C., 10 kg load conditions) value with respect to the melt index (190° C., 2.16 kg load conditions), is 8.5 or less.

10. The ethylene/1-butene copolymer according to claim 1, which has a weight average molecular weight (Mw) of 40,000 to 150,000 g/mol.

11. The ethylene/1-butene copolymer according to claim 1, wherein the molecular weight distribution is 1.5 to 2.2.

12. A resin composition for an optical film, comprising the ethylene/1-butene copolymer according to claim 1.

13. The resin composition for an optical film according to claim 12, wherein the resin composition has a yellow index value measured after performing crosslinking of 1.5 or less.

14. The resin composition for an optical film according to claim 12, wherein the resin composition has a total light transmittance (Tt) measured after performing crosslinking of 90.0% or more.

15. An optical film comprising the resin composition for an optical film of claim 12.

16. The ethylene/1-butene copolymer according to claim 1, wherein the 1-butene is comprised in an amount of greater than 0 to 99 mol % or less based on a total weight of the copolymer.

17. A method for preparing the ethylene/1-butene copolymer of claim 1, the method comprising:

a step of polymerizing ethylene and 1-butene by injecting hydrogen in 5 to 100 cc/min in the presence of a catalyst composition comprising a transition metal compound represented by the following Formula 1:

[Formula 1]

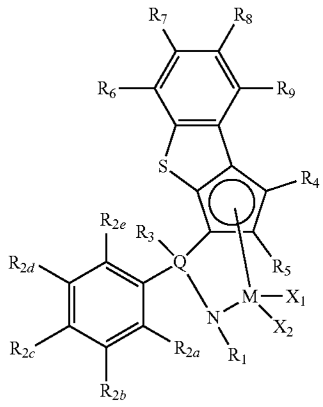

in Formula 1, $R_1$ is hydrogen; C1-20 alkyl; C3-20 cycloalkyl; C2-20 alkenyl; C1-20 alkoxy; C6-20 aryl; C7-20 arylalkoxy; C7-20 alkylaryl; or C7-20 arylalkyl, $R_{2a}$ to $R_{2e}$ are each independently hydrogen; halogen; C1-20 alkyl; C3-20 cycloalkyl; C2-20 alkenyl; C1-20 alkoxy; or C6-20 aryl, $R_3$ is hydrogen; halogen; C1-20 alkyl; C3-20 cycloalkyl; C2-20 alkenyl; C6-20 aryl; C7-20 alkylaryl; C7-20 arylalkyl; C1-20 alkyl amino; C6-20 aryl amino; or phenyl which is substituted with one or more selected from the group consisting of halogen, C1-20 alkyl, C3-20 cycloalkyl, C2-20 alkenyl, C1-20 alkoxy and C6-20 aryl, $R_4$ to $R_9$ are each independently hydrogen; silyl; C1-20 alkyl; C3-20 cycloalkyl; C2-20 alkenyl; C6-20 aryl; C7-20 alkylaryl; C7-20 arylalkyl; or a metalloid radical of a metal in group 14 which is substituted with C1-20 hydrocarbyl; wherein among the $R_6$ to $R_9$, adjacent two or more are optionally connected with each other to form a ring, Q is Si, C, N, P or S, M is a transition metal in group 4, and $X_1$ and $X_2$ are each independently hydrogen; halogen; C1-20 alkyl; C3-20 cycloalkyl; C2-20 alkenyl; C6-20 aryl; C7-20 alkylaryl; C7-20 arylalkyl; C1-20 alkylamino; or C6-20 arylamino.

18. The method for preparing the ethylene/1-butene copolymer according to claim 17, wherein $R_1$ is hydrogen; C1-12 alkyl; C3-12 cycloalkyl; C1-12 alkoxy; C6-12 aryl; C7-13 arylalkoxy; C7-13 alkylaryl; or C7-13 arylalkyl, $R_{2a}$ to $R_{2e}$ are each independently hydrogen; halogen; C1-12 alkyl; C3-12 cycloalkyl; C2-12 alkenyl; C1-12 alkoxy; or phenyl, $R_3$ is hydrogen; halogen; C1-12 alkyl; C3-12 cycloalkyl; C2-12 alkenyl; C7-13 alkylaryl; C7-13 arylalkyl; phenyl; or phenyl which is substituted with one or more selected from the group consisting of halogen, C1-12 alkyl, C3-12 cycloalkyl, C2-12 alkenyl, C1-12 alkoxy and phenyl, $R_4$ to $R_9$ are each independently hydrogen; C1-12 alkyl; C3-12 cycloalkyl; C6-12 aryl; C7-13 alkylaryl; or C7-13 arylalkyl;

wherein among the $R_6$ to $R_9$, adjacent two or more are optionally connected with each other to form a C5-12 aliphatic ring or a C6-12 aromatic ring, the aliphatic ring or the aromatic ring is optionally substituted with halogen, C1-12 alkyl, C2-12 alkenyl, or C6-12 aryl, Q is Si, M is Ti, and $X_1$ and $X_2$ are each independently hydrogen; halogen; C1-12 alkyl; or C2-12 alkenyl.

19. The method for preparing the ethylene/1-butene copolymer according to claim 17, wherein the transition metal compound is selected from the group consisting of compounds of the following Formula 1-1 to Formula 1-10:

[Formula 1-1]

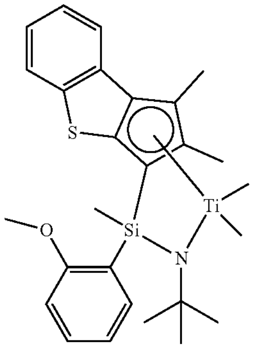

[Formula 1-2]

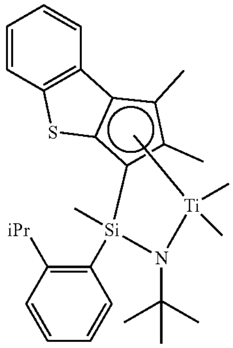

[Formula 1-3]

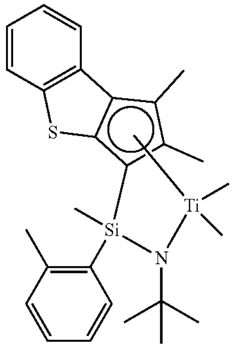

-continued
[Formula 1-4]
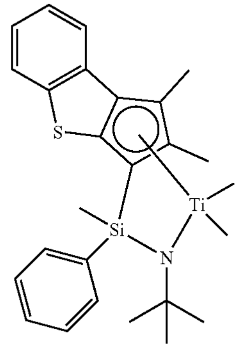
[Formula 1-5]
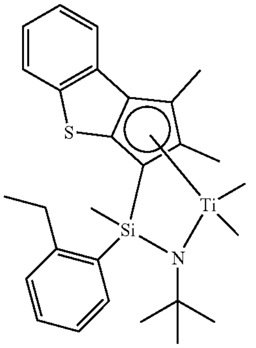
[Formula 1-6]
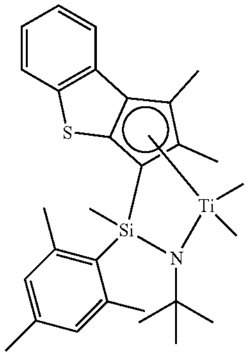
[Formula 1-7]
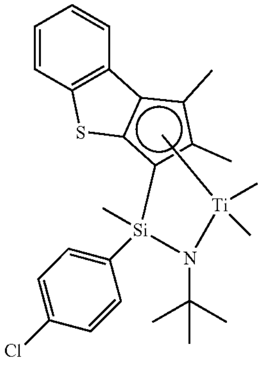
-continued
[Formula 1-8]
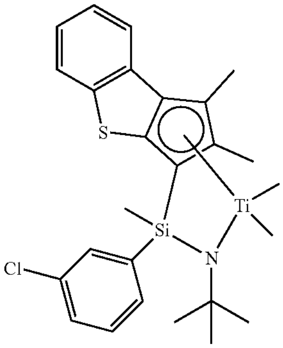
[Formula 1-9]
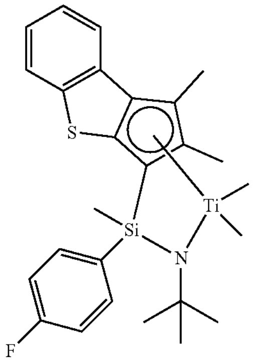
[Formula 1-10]
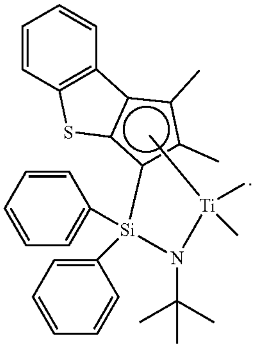
* * * * *